US012632258B1

(12) United States Patent
Spadini et al.

(10) Patent No.: US 12,632,258 B1
(45) Date of Patent: May 19, 2026

(54) FUSED INSTRUCTION OPERATION FOR PERFORMING AN OPERATION AND ADJUSTING A SIGN OF THE OPERATION RESULT

(71) Applicant: Apple Inc., Cupertino, CA (US)

(72) Inventors: Francesco Spadini, Sunset Valley, TX (US); Skanda K. Srinivasa, Austin, TX (US); Zhaoxiang Jin, Austin, TX (US)

(73) Assignee: Apple Inc., Cupertino, CA (US)

( * ) Notice: Subject to any disclaimer, the term of this patent is extended or adjusted under 35 U.S.C. 154(b) by 89 days.

(21) Appl. No.: 18/188,123

(22) Filed: Mar. 22, 2023

Related U.S. Application Data

(60) Provisional application No. 63/376,699, filed on Sep. 22, 2022.

(51) Int. Cl.
*G06F 9/30* (2018.01)

(52) U.S. Cl.
CPC ...... *G06F 9/30145* (2013.01); *G06F 9/30185* (2013.01)

(58) Field of Classification Search
CPC . G06F 9/30185; G06F 9/3001; G06F 9/30014
See application file for complete search history.

(56) References Cited

U.S. PATENT DOCUMENTS

| | | | |
|---|---|---|---|
| 3,793,631 A | * | 2/1974 | Silverstein ............ G06F 9/3842 |
| | | | 712/E9.05 |
| 5,303,356 A | | 4/1994 | Vassiliadis |

| | | | |
|---|---|---|---|
| 5,420,992 A | | 5/1995 | Killian |
| 5,689,695 A | | 11/1997 | Read |
| 5,774,737 A | | 6/1998 | Nakano |
| 5,794,063 A | | 8/1998 | Favor |

(Continued)

FOREIGN PATENT DOCUMENTS

WO       2019218896 A1    11/2019

OTHER PUBLICATIONS

J. E. Smith, "Future Superscalar Processors Based On Instruction Compounding," Published 2007, Computer Science, pp. 121-131.

(Continued)

*Primary Examiner* — Keith E Vicary
(74) *Attorney, Agent, or Firm* — Kowert, Hood, Munyon, Rankin & Goetzel, P.C.; Gentry C. McLean; Dean M. Munyon

(57) ABSTRACT

Techniques are disclosed involving fusing instruction pairs and executing corresponding fused instruction operations. A processor includes fusion detection circuitry to detect a pair of fetched instructions and fuse the instructions into a fused instruction operation, and execution circuitry to execute the fused instruction operation. In one embodiment, a first instruction is executable to perform an operation and a second instruction is executable to adjust a sign of a result of the operation. In another embodiment, the first instruction is executable to perform an operation and the second instruction is executable to find a maximum or minimum, as compared to a comparison operand, of a result of the operation. In another embodiment, the first instruction is executable to perform a vector operation and the second instruction is executable to read a first element of the vector result and overwrite one or more additional elements of the vector result.

20 Claims, 13 Drawing Sheets

(56)  References Cited

U.S. PATENT DOCUMENTS

| | | | |
|---|---|---|---|
| 5,805,486 | A | 9/1998 | Sharangpani |
| 5,889,984 | A | 3/1999 | Mills |
| 6,292,888 | B1 | 9/2001 | Nemirovsky et al. |
| 6,295,599 | B1 | 9/2001 | Hansen et al. |
| 6,338,136 | B1 | 1/2002 | Col |
| 6,560,624 | B1 | 5/2003 | Otani et al. |
| 6,754,810 | B2 | 6/2004 | Elliott et al. |
| 7,055,022 | B1 | 5/2006 | Col |
| 7,818,550 | B2 | 10/2010 | Vaden |
| 8,078,845 | B2 | 12/2011 | Sheffer et al. |
| 8,713,084 | B2 | 4/2014 | Weinberg |
| 9,501,286 | B2 | 11/2016 | Col |
| 9,747,101 | B2 | 8/2017 | Ould-Ahmed-Vall et al. |
| 10,324,724 | B2 | 6/2019 | Lai et al. |
| 10,579,389 | B2 | 3/2020 | Lai et al. |
| 12,008,369 | B1 | 6/2024 | Pape et al. |
| 2001/0052063 | A1* | 12/2001 | Tremblay ............ G06F 9/30098 712/E9.031 |
| 2002/0087955 | A1* | 7/2002 | Ronen ................... G06F 9/3893 712/E9.037 |
| 2003/0167460 | A1* | 9/2003 | Desai ................... G06F 9/3853 712/E9.034 |
| 2003/0236966 | A1 | 12/2003 | Samra |
| 2004/0034757 | A1 | 2/2004 | Gochman |
| 2004/0128483 | A1* | 7/2004 | Grochowski ....... G06F 9/30181 712/217 |
| 2005/0084099 | A1 | 4/2005 | Montgomery |
| 2005/0289208 | A1 | 12/2005 | Harrison |
| 2007/0038844 | A1* | 2/2007 | Valentine .............. G06F 9/3853 712/219 |
| 2010/0115248 | A1 | 5/2010 | OuZiel et al. |
| 2010/0299505 | A1* | 11/2010 | Uesugi ................ G06F 9/30181 712/226 |
| 2011/0035570 | A1 | 2/2011 | Col |
| 2011/0264896 | A1 | 10/2011 | Parks |
| 2011/0264897 | A1 | 10/2011 | Henry |
| 2012/0144174 | A1 | 6/2012 | Talpes |
| 2013/0024937 | A1 | 1/2013 | Glew et al. |
| 2013/0125097 | A1 | 5/2013 | Ebcioglu et al. |
| 2013/0179664 | A1 | 7/2013 | Olson et al. |
| 2013/0262841 | A1 | 10/2013 | Gschwind |
| 2014/0047221 | A1 | 2/2014 | Irwin |
| 2014/0208073 | A1 | 7/2014 | Blasco-Allue |
| 2014/0281397 | A1 | 9/2014 | Loktyukhn et al. |
| 2014/0351561 | A1 | 11/2014 | Parks |
| 2015/0039851 | A1 | 2/2015 | Uliel |
| 2015/0089145 | A1 | 3/2015 | Steinmacher-Burow |
| 2016/0004504 | A1 | 1/2016 | Elmer |
| 2016/0147290 | A1* | 5/2016 | Williamson .......... G06F 1/3287 713/323 |
| 2016/0179542 | A1 | 6/2016 | Lai |
| 2016/0291974 | A1 | 10/2016 | Srinivas et al. |
| 2016/0378487 | A1 | 12/2016 | Ouziel |
| 2017/0102787 | A1 | 4/2017 | Gu et al. |
| 2017/0123808 | A1* | 5/2017 | Caulfield .............. G06F 9/3836 |
| 2017/0177343 | A1* | 6/2017 | Lai ........................ G06F 9/3016 |
| 2017/0364363 | A1* | 12/2017 | Darbari ................. G06F 9/3867 |
| 2018/0129498 | A1 | 5/2018 | Levison et al. |
| 2018/0129501 | A1* | 5/2018 | Levison ................ G06F 9/3802 |
| 2018/0267775 | A1 | 9/2018 | Gopal |
| 2018/0300131 | A1 | 10/2018 | Tannenbaum et al. |
| 2019/0056943 | A1 | 2/2019 | Gschwind et al. |
| 2019/0102197 | A1 | 4/2019 | Kumar et al. |
| 2019/0108023 | A1 | 4/2019 | Lloyd et al. |
| 2020/0042322 | A1 | 2/2020 | Wang et al. |
| 2020/0402287 | A1 | 12/2020 | Shah et al. |
| 2021/0124582 | A1 | 4/2021 | Kerr et al. |
| 2022/0019436 | A1 | 1/2022 | Lloyd et al. |
| 2022/0035634 | A1 | 2/2022 | Lloyd |

OTHER PUBLICATIONS

Christopher Celio et al., "The Renewed Case for the Reduced Instruction Set Computer: Avoiding ISA Bloat with Macro-Op Fusion for RISC-V," arXiv:1607.02318v1 [cs.AR] Jul. 8, 2016; 16 pages.

Abhishek Deb et al., "SoftHV : A HW/SW Co-designed Processor with Horizontal and Vertical Fusion," CF'11, May 3-5, 2011, 10 pages.

Ian Lee, "Dynamic Instruction Fusion," UC Santa Cruz Electronic Theses and Dissertations, publication date Dec. 2012, 59 pages.

Office Action in U.S. Appl. No. 17/652,501 mailed Nov. 1, 2023, 47 pages.

* cited by examiner

*800*

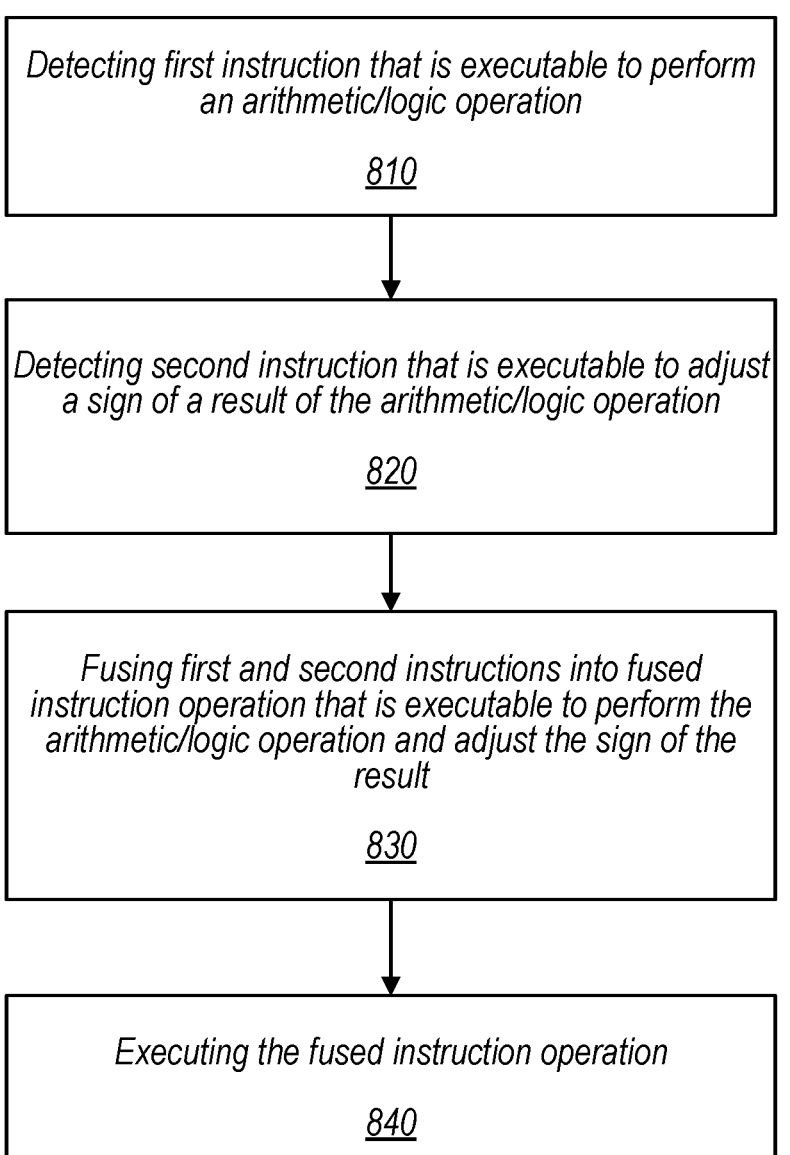

Detecting first instruction that is executable to perform an arithmetic/logic operation

810

Detecting second instruction that is executable to adjust a sign of a result of the arithmetic/logic operation

820

Fusing first and second instructions into fused instruction operation that is executable to perform the arithmetic/logic operation and adjust the sign of the result

830

Executing the fused instruction operation

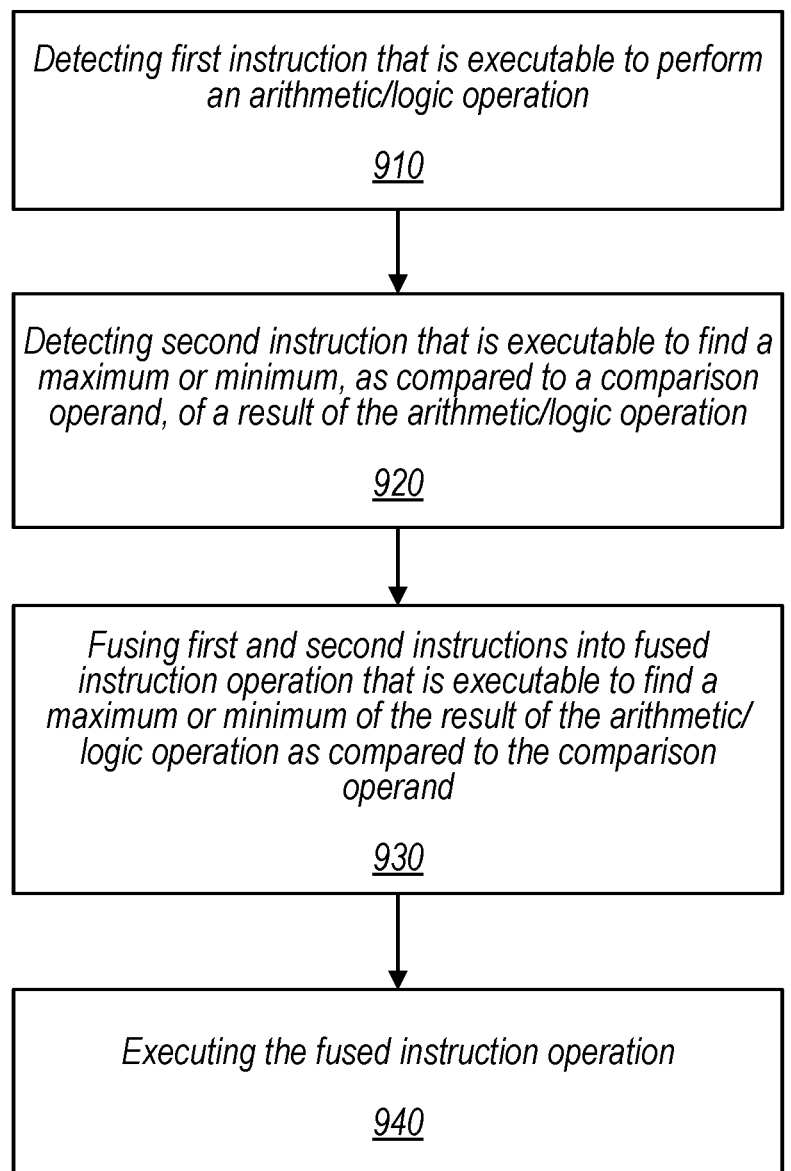

*900*

Detecting first instruction that is executable to perform an arithmetic/logic operation

*910*

Detecting second instruction that is executable to find a maximum or minimum, as compared to a comparison operand, of a result of the arithmetic/logic operation

*920*

Fusing first and second instructions into fused instruction operation that is executable to find a maximum or minimum of the result of the arithmetic/logic operation as compared to the comparison operand

*930*

Executing the fused instruction operation

1000

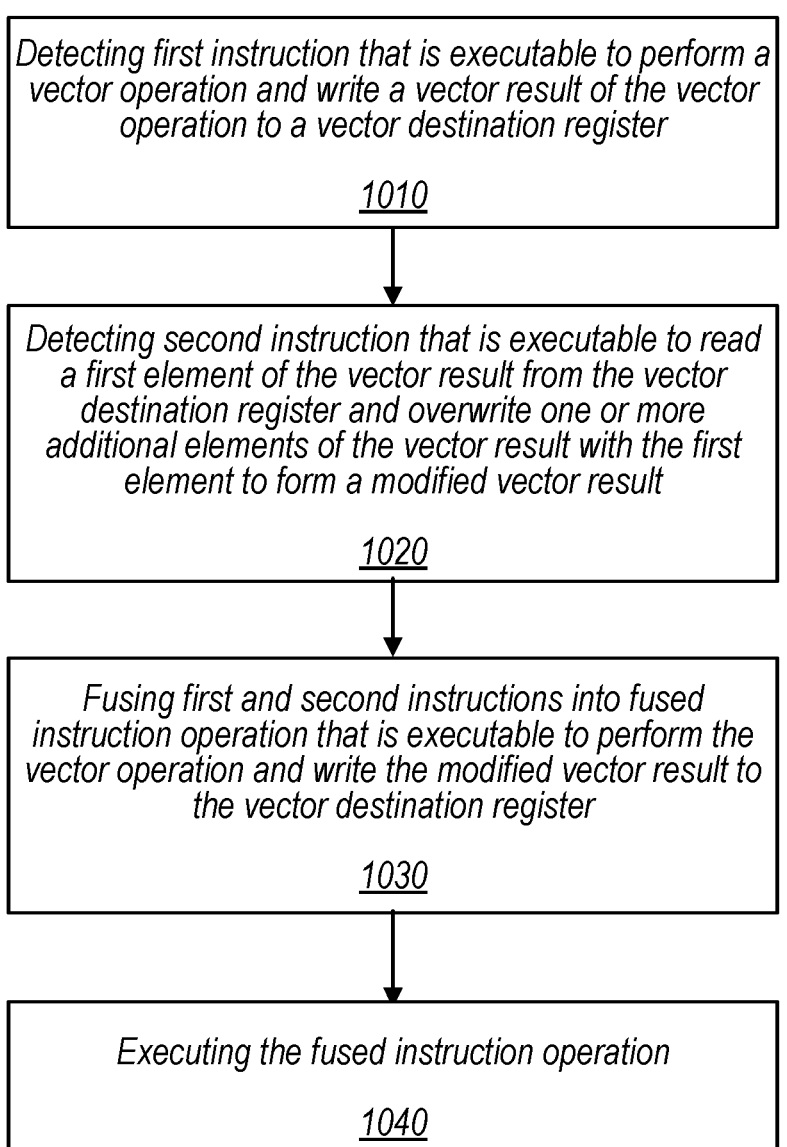

Detecting first instruction that is executable to perform a vector operation and write a vector result of the vector operation to a vector destination register

1010

Detecting second instruction that is executable to read a first element of the vector result from the vector destination register and overwrite one or more additional elements of the vector result with the first element to form a modified vector result

1020

Fusing first and second instructions into fused instruction operation that is executable to perform the vector operation and write the modified vector result to the vector destination register

1030

Executing the fused instruction operation

System
1300

Power Supply
1305

Peripherals
1140

Memory
1110

SOC
1100

1360

1370

1380

1390

1350

1340

1330

1320

1310

FUSED INSTRUCTION OPERATION FOR PERFORMING AN OPERATION AND ADJUSTING A SIGN OF THE OPERATION RESULT

CROSS-REFERENCE TO RELATED APPLICATIONS

The present application claims priority to U.S. Provisional App. No. 63/376,699 entitled "Instruction Fusion," filed Sep. 22, 2022, the disclosure of which is incorporated by reference herein in its entirety.

BACKGROUND

Technical Field

This disclosure relates generally to a computer processor and, more specifically, to the fusion of certain instructions.

Description of the Related Art

Modern computer systems often include processors that are integrated onto a chip with other computer components, such as memories or communication interfaces. During operation, those processors execute instructions to implement various software routines, such as user software applications and an operating system. As part of implementing a software routine, a processor normally executes various different types of instructions, such as instructions to generate values needed by the software routine. The specific set of instructions executed by a given processor is defined by the processor's instruction set architecture (ISA).

Instructions executed by a processor may perform operations on data represented using various formats, such as integer format or floating-point format. Some processor embodiments use separate execution units, or execution circuits, for integer instructions and floating-point instructions. Processors may also use separate execution circuits for vector instructions and scalar instructions. In some cases, vector instructions are handled by an execution circuit that also handles floating-point instructions.

BRIEF DESCRIPTION OF THE DRAWINGS

FIG. 8 is a flow diagram illustrating an example method relating to generating and executing an instruction operation that performs an operation and adjusts a sign of a result of the operation, according to some embodiments.

FIG. 9 is a flow diagram illustrating an example method relating to generating and executing an instruction operation that performs an operation and finds a maximum or minimum, as compared to a comparison operand, of a result of the operation, according to some embodiments.

FIG. 10 is a flow diagram illustrating an example method relating to generating and executing an instruction operation that fuses an instruction for performing a vector operation and writing a vector result to a vector destination register with an instruction for reading a first element of the vector result and overwriting one or more elements of the vector result with the first element, according to some embodiments.

DETAILED DESCRIPTION

Figure 1:
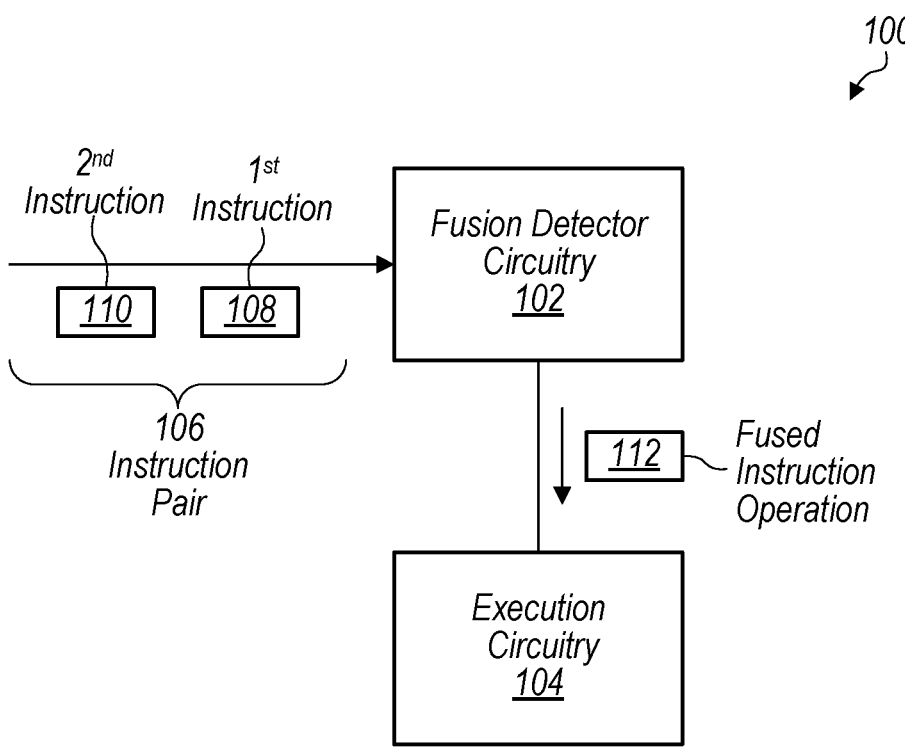
FIG. 1 is a block diagram illustrating example elements of a processor configured to fuse instructions, according to some embodiments.

As mentioned above, the set of instructions available to a programmer using a given processor is defined by the processor's instruction set architecture (ISA). There are a variety of instruction set architectures in existence (e.g., the x86 architecture originally developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. For a given ISA, there are often operations that programmers want to implement that do not correspond to a single instruction in the ISA. Such operations may therefore be implemented using two or more instructions.

Using a pair (or more) of instructions to implement an operation that could be done with one instruction can cause technical problems that reduce processor performance in multiple ways. As one example, execution of two instructions may increase the latency, or number of clock cycles required, to implement an operation. An increase in latency may particularly result if one or both of the two instructions implements a simple operation that can be done in a single cycle.

In addition to potentially increasing latency of a processor operation, using a pair of instructions rather than a single instruction can reduce performance by adding to traffic in the processor's instruction pipeline, potentially increasing power usage or congestion in elements such as the scheduler and reservation stations. Therefore, "fusing" a pair of instructions for execution as a single decoded instruction (or "instruction operation" as used herein) can reduce the amount of resources that would otherwise be consumed by processing those instructions separately. For example, an entry of a re-order buffer may be saved by storing one instead of two decoded instructions and an additional physical register may not need to be allocated. As another example, dispatch bandwidth, or a number of instruction operations dispatched to a reservation station per cycle, may be lowered by instruction fusion. In addition, issue bandwidth, or a number of instruction operations scheduled to an execution unit per cycle, may be lowered by fusion. More efficient and/or lower-power operation of the processor at multiple stages may therefore result from instruction fusion.

The inventors have recognized certain instruction pairs that can be fused for implementation as single instruction operations using additional or modified execution logic. The present disclosure describes techniques for detecting, fusing, and executing such instruction pairs. Embodiments of the disclosed processors and methods implement fused execution of one or more of the types of instruction pairs described herein.

In one embodiment, an instruction pair detected for fusing includes a first instruction for performing an operation to produce an operation result followed by a second instruction for adjusting a sign of the operation result. The second instruction for adjusting the sign may include, for example, a negation instruction or an absolute value instruction. The first instruction may, in various embodiments, include one of various arithmetic operation instructions, a move instruction, or a maximum instruction. In embodiments described herein, the first and second instructions are fused into a single instruction operation that is executable using specific execution circuitry to perform the operation and adjust the sign of the operation result.

In an embodiment described herein, an instruction pair detected for fusing includes a first instruction for performing an operation followed by a second instruction for finding a maximum or a minimum of the result of the operation as compared to an additional operand. The first instruction may be an instruction for implementing various arithmetic and other operations. In an embodiment, the first instruction is an instruction having fewer operands than the maximum number of operands supported by the ISA. For example, if the ISA supports no more than three operands for an instruction, the first instruction is in some embodiments an instruction using no more than two operands. In such an embodiment, the first and second instructions can be fused such that the additional operand for the maximum or minimum operation is carried by the fused instruction operation. In some embodiments, the first instruction is also a maximum or minimum instruction, so that the fused instruction operation is executable to take a maximum, minimum or combination of the two among a group of operands, such as a group of three operands. Such a fusion may reduce the number of instructions needed to perform a three-way comparison, which may reduce power and bandwidth demands on the processor and decrease latency for performing the comparison.

Another embodiment of an instruction pair detected for fusing includes a first instruction that is executable to perform a vector operation and write a result of the operation to a vector register and a second instruction that is executable to read a first element of the vector result from the vector register and overwrite one or more additional elements of the vector result with the first element. In embodiments described herein, the first and second instructions are fused into a single instruction operation that is executable using execution circuitry to perform the vector operation and write the first element of the vector result to the portions of the vector register that the first element would have been written to by the second instruction. In this way, cycles associated with initially storing the full vector result, then reading the first element to overwrite some of the initially stored elements may be saved. In various embodiments, the operands and result of the vector operation are stored in any of various formats including a packed integer format or a packed floating-point format.

In some embodiments, the first and second instructions for fusion techniques as described herein are floating-point instructions operating on floating-point values. Fusion of floating-point instructions as described herein may be particularly advantageous because some floating-point processors use a minimum of two clock cycles to schedule an instruction. Each instruction operation executed therefore contributes at least two cycles of latency in this type of processor, so that executing an instruction operation to complete a simple operation that could be accomplished in one cycle wastes at least one cycle if there is a way to combine the simple operation with execution of another instruction operation. Embodiments of execution circuitry as described herein may allow implementation of two-instruction operations under a given ISA by executing a single fused instruction operation. Fusion of floating-point instructions may also be particularly advantageous in the above-described embodiment of fusing an instruction to perform an operation with an instruction to adjust a sign of the result of the operation, because floating-point representations may use a single bit to represent the sign of a number. Changing a sign in such an embodiment is therefore a matter of changing a single bit, which can be implemented efficiently in execution circuitry.

In some embodiments, the first and second instructions for fusion techniques as described herein are instructions for performing operations on packed integer data, in which multiple integer values are stored in a single register, or packed floating-point data, in which multiple floating-point values are stored in a single register. Such instructions may be referred to as vector instructions. In some processors scheduling of vector instructions uses a minimum of two cycles, so that fusion of packed integer operations may have latency advantages in a manner similar to fusion of floating-point operations in floating-point processors having a minimum two-cycle scheduling delay.

FIG. 1 illustrates certain elements of a processor 100 configured to fuse certain instruction pairs. As shown, processor 100 includes fusion detector circuitry 102 coupled to execution circuitry 104. In an example of a fusion process, an instruction pair 106 including a first instruction 108 and second instruction 110 are received by fusion detector circuitry 102. If eligible for fusion, the two instructions may be fused to form fused instruction operation 112, which is sent to execution circuitry 104 for execution. As discussed above, first instruction 108 of instruction pair 106 may in some embodiments be an instruction to perform an operation, and second instruction 110 may be an instruction to adjust a sign of the result of the operation. Such an embodiment is further illustrated in FIGS. 3, 4 and 8. In other embodiments, first instruction 108 may be an instruction to perform an operation and second instruction 110 may be an instruction to find a maximum or minimum of the result of the operation as compared with an additional operand. Such an embodiment is further illustrated in FIGS. 5, 6, 7 and 9. In another embodiment, first instruction 108 is an instruction to perform a vector operation and write a vector result of the operation to a vector register and second instruction 110 is an instruction to read a first element of the vector result and overwrite additional elements of the vector result with the first element. Such an embodiment is further illustrated in FIG. 10.

Figure 3:
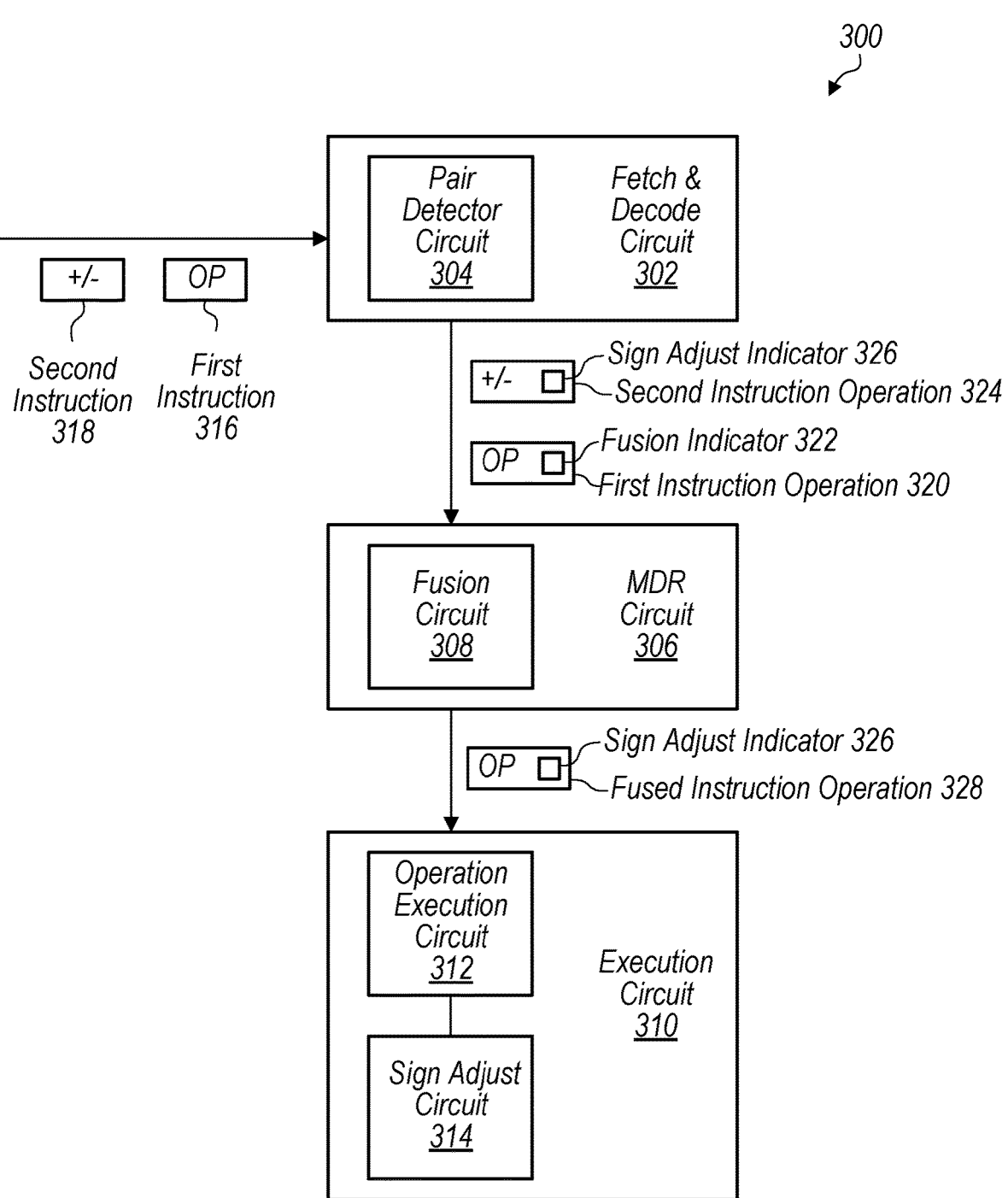
FIG. 3 is a block diagram illustrating example elements of a processor configured to fuse instructions for adjusting a sign of an operation result, according to some embodiments.
Figure 4:
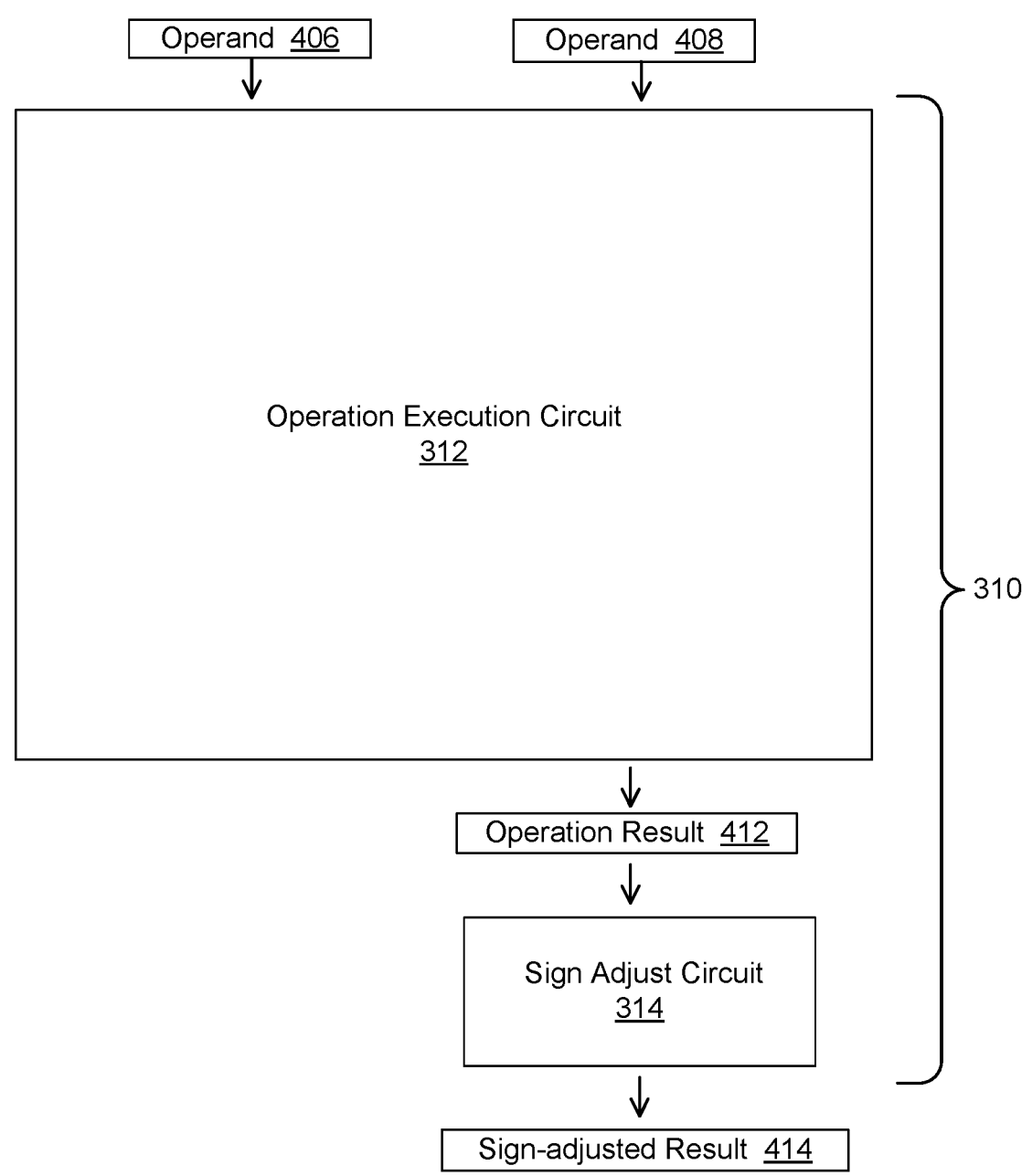
FIG. 4 is a block diagram illustrating an example of execution circuitry for executing a fused instruction operation for performing an operation and adjusting a sign of the operation result, according to some embodiments.
Figure 5:
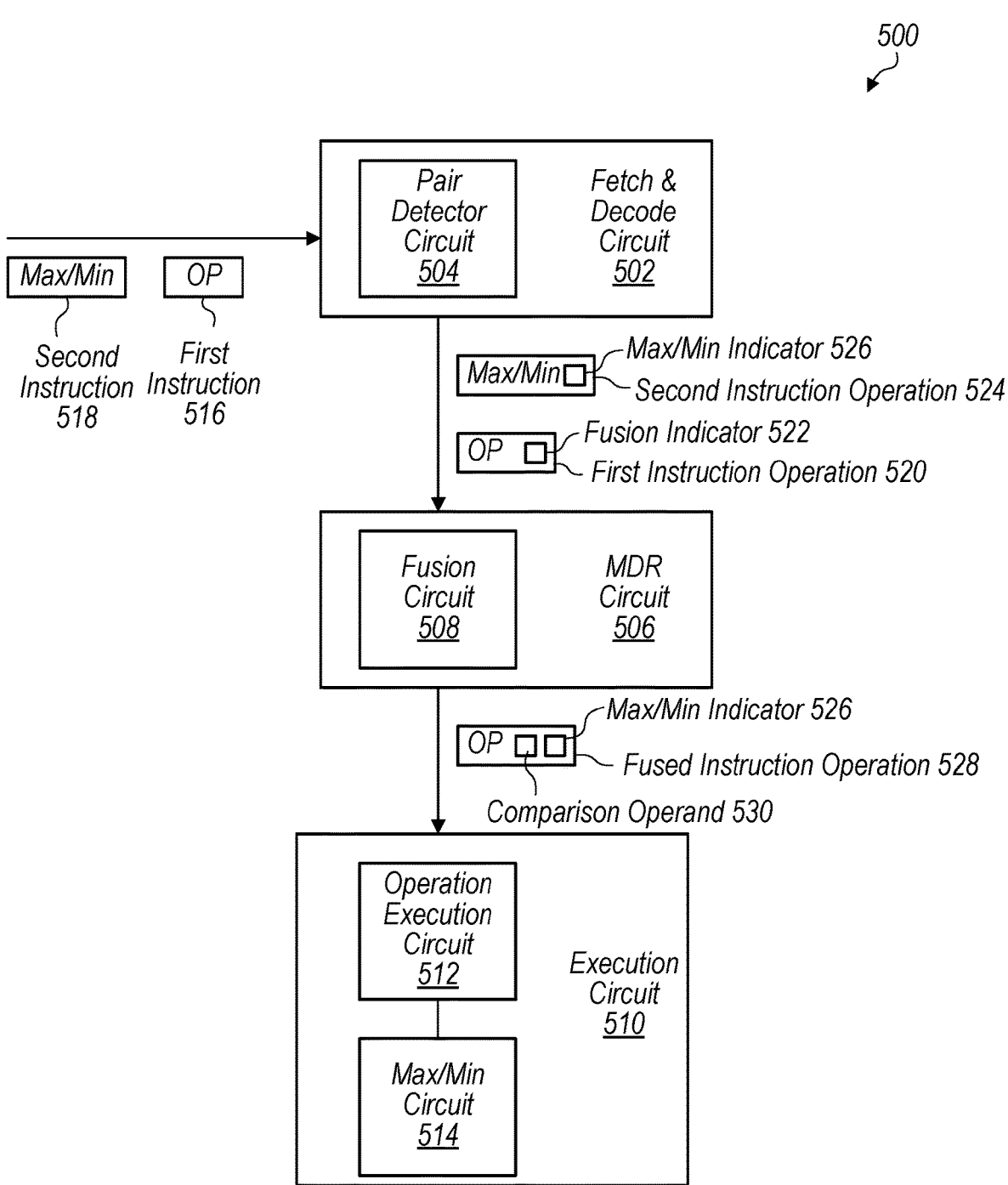
FIG. 5 is a block diagram illustrating example elements of a processor configured to fuse instructions for finding a maximum or minimum of an operation result as compared to another operand, according to some embodiments.
Figure 6:
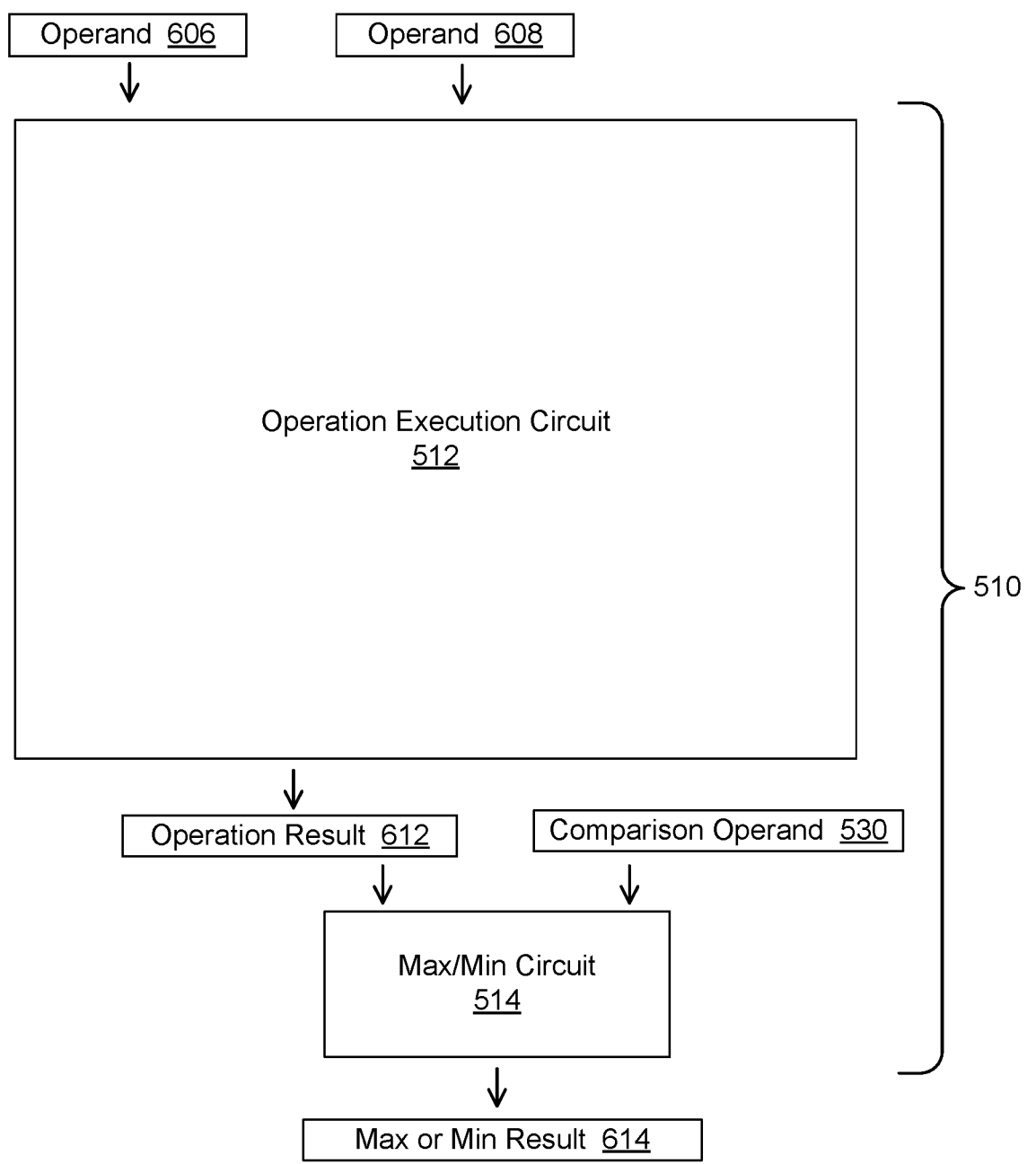
FIG. 6 is a block diagram illustrating an example of execution circuitry for executing a fused instruction operation for finding a maximum or minimum of an operation result as compared to another operand, according to some embodiments.
Figure 7:
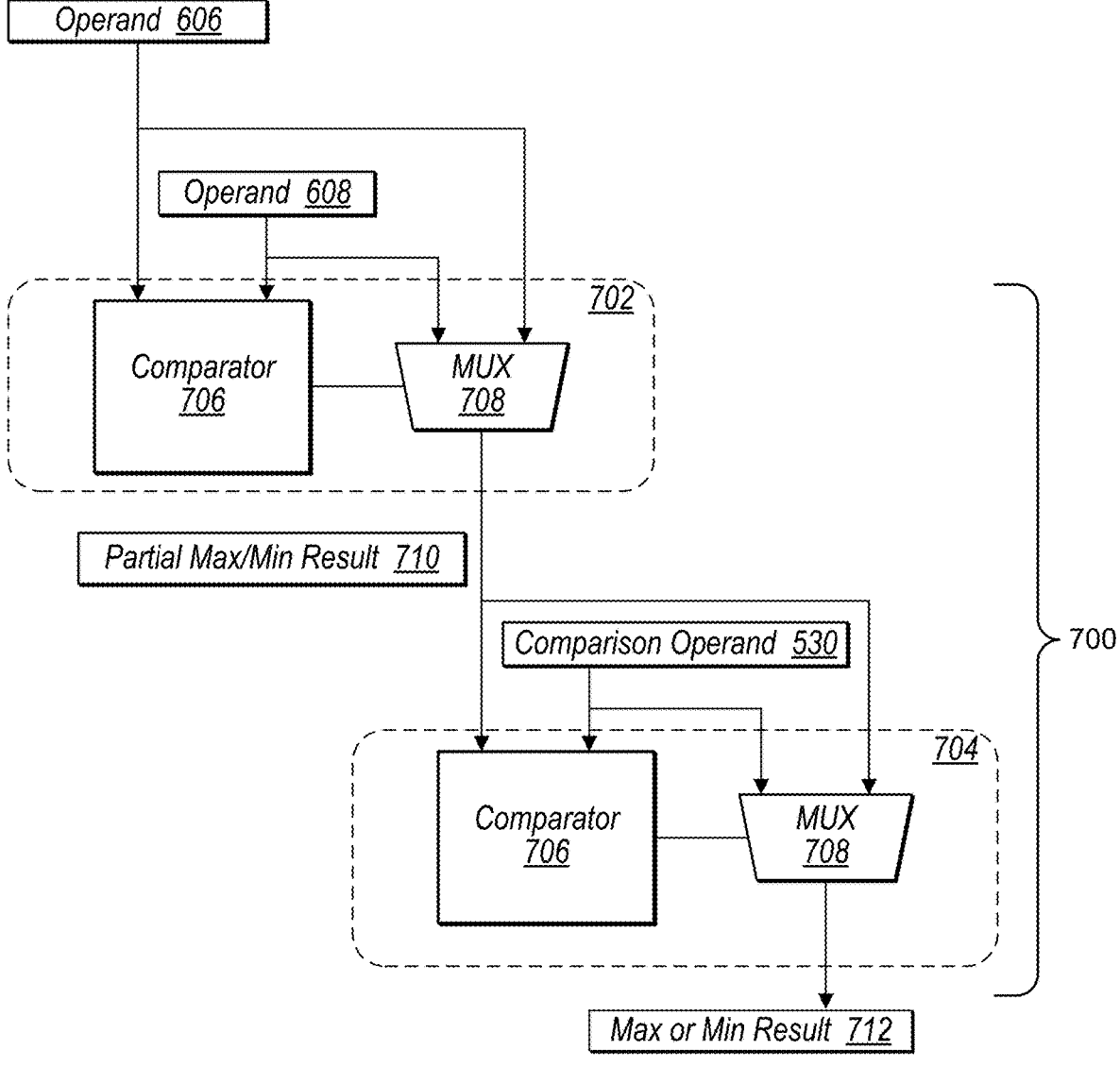
FIG. 7 is a block diagram illustrating an example of execution circuitry for executing a fused instruction operation for finding a maximum or minimum, as compared to another operand, of a maximum or minimum of two operands, according to some embodiments.

In an embodiment, execution circuitry 104 includes an operation execution circuit configured to produce an operation result and an additional execution circuit configured to perform an additional operation using the operation result. In some embodiments, the additional execution circuit includes a sign adjust circuit, as shown in FIGS. 3-4. In some embodiments the additional circuit includes a circuit for finding a maximum or minimum, as shown in FIGS. 5-7. In some embodiments, the operation execution circuit is a vector operation execution circuit and the additional circuit includes a circuit for writing a first element of the result of the vector operation to additional elements of the result. In an embodiment, the additional circuit and/or the operation execution circuit is a replicated version of a circuit used elsewhere in execution circuitry of the processor. In the case of a relatively simple operation, the cost associated with replication of the required execution circuitry may be small, and use of replicated circuitry may avoid a need to set blocking conditions to reserve portions of execution circuitry for execution of fused instruction operations as opposed to non-fused instruction operations.

Figure 2:
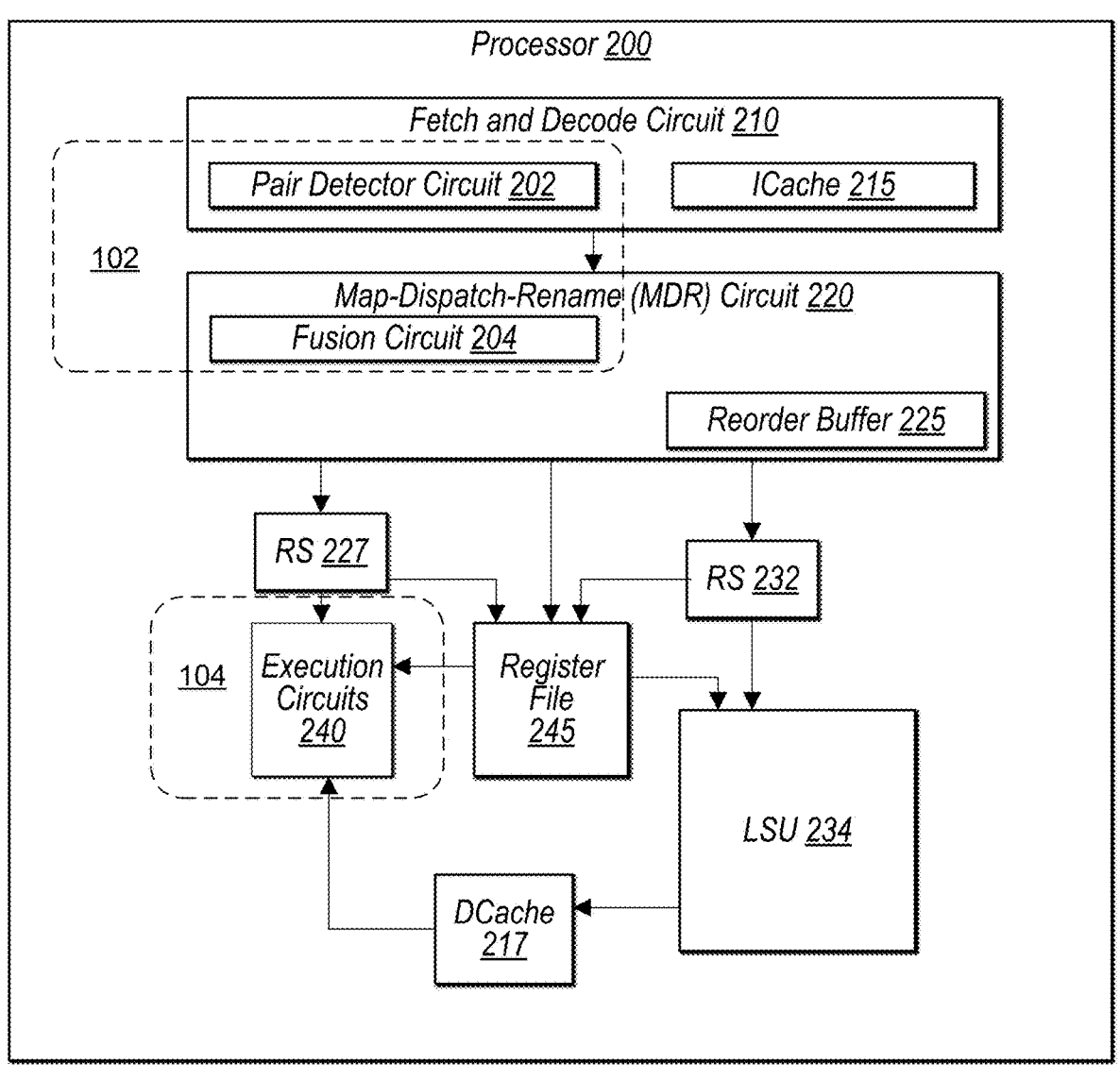
FIG. 2 is a block diagram illustrating additional example elements of a processor that is configured to fuse instructions, according to some embodiments.

Turning to FIG. 2, additional example elements of a processor configured to fuse certain instruction pairs are shown. In the illustrated embodiment, processor 200 includes a fetch and decode circuit 210, a map-dispatch-rename (MDR) circuit 220, a set of reservation stations (RSs) 227 and 232, one or more execution units, or execution circuits, 240, a register file 245, a data cache, or "DCache", 217, and a load/store unit (LSU) 234. As depicted, fetch and decode unit, or fetch and decode circuit, 210 includes a pair detector circuit 202 and an instruction cache, or "ICache", 215 and is coupled to MDR unit, or MDR circuit, 220, which includes a reorder buffer 225 and fusion circuit 204 and is coupled to RS 227 and LSU 234. More particularly, MDR circuit 220 is coupled to an RS 232 associated with LSU 234. RS 227 is coupled to execution circuits 240. As depicted, register file 245 is coupled to execution circuits 240 and LSU 234. Processor 200 may include multiple other elements not shown in FIG. 2, such as an external interface, or core interface for communicating with the rest of a system including processor 200.

Fetch and decode circuit 210, in various embodiments, is configured to fetch instructions for execution by processor 200 and decode the instructions into instruction operations (briefly "ops") for execution. More particularly, fetch and decode circuit 210 may be configured to cache instructions fetched from a memory (e.g., memory 1110 of FIG. 11) through an external interface into ICache 215, and may fetch a speculative path of instructions for processor 200. Fetch and decode circuit 210 may implement various prediction structures for predicting the fetch path, such as one that predicts fetch addresses based on previously executed instructions. As used herein an "instruction" is an executable entity defined in an ISA implemented by a processor such as processor 200. In various embodiments, fetch and decode circuit 210 may decode an instruction into multiple ops depending on the complexity of that instruction. Particularly complex instructions may be microcoded. In such embodiments, the microcode routine for an instruction may be coded in ops. In other embodiments, however, each instruction within the instruction set architecture implemented by processor 200 may be decoded into a single op, and thus the op can be synonymous with its corresponding instruction (although it may be modified in form by the decoder).

Accordingly, the term "instruction operation" or "op" may be used herein to refer to an operation that an execution circuit in a processor is configured to execute as a single entity.

In various embodiments, fetch and decode circuit 210 is configured to identify candidate instructions for fusion and provide an indication of those candidate instructions to MDR circuit 220. Fetch and decode circuit 210 may scan across its decode lanes to search for particular combinations of instructions. Such combinations may include but are not limited to an instruction for performing an operation and an instruction for adjusting a sign of the result of the operation, an instruction for performing an operation and an instruction for finding a maximum or minimum of the result of the operation as compared to an additional operand, and an instruction for performing a vector operation and an instruction for writing a first element of the vector operation result to additional elements of the result. In some embodiments conditions may be applied to determine whether an instruction pair is eligible for fusion. The instructions of a combination might not be eligible for fusion, for example, if the instructions are not sequential or otherwise within a specified instruction distance (e.g., three instructions) of each other in program order, or if the instructions fall within different batches of instructions ("instruction groups"). In various embodiments, fetch and decode circuit 210 marks eligible combinations (e.g., by setting bits of the decoded instructions) and provides them to MDR circuit 220. In some embodiments, the fusion of eligible instructions occurs within fetch and decode circuit 210. Fusion detection circuitry 102 from FIG. 1 is shown in FIG. 2 as implemented using a combination of portions of fetch and decode circuit 210 and MDR circuit 220.

ICache 215 and DCache 217, in various embodiments, may each be a cache having any desired capacity, cache line size, and configuration. A cache line may be allocated/deallocated in a cache as a unit and thus may define the unit of allocation/deallocation for the cache. Cache lines may vary in size (e.g., 32 bytes, 64 bytes, or larger or smaller). Different caches may have different cache line sizes. There may further be more additional levels of cache between ICache 215/DCache 217 and a main memory, such as a last level cache. In various embodiments, ICache 215 is used to cache fetched instructions and DCache 217 is used to cache data fetched or generated by processor 200.

MDR circuit 220, in various embodiments, is configured to map ops received from fetch and decode circuit 210 to speculative resources (e.g., physical registers) in order to permit out-of-order and/or speculative execution. As shown, MDR circuit 220 can dispatch the ops to RS 227 and RS 232. The ops may be mapped to physical registers in register file 245 from the architectural registers used in the corresponding instructions. That is, register file 245 may implement a set of physical registers that are greater in number than the architectural registers specified by the instruction set architecture implemented by processor 200. As such, MDR circuit 220 may manage a mapping between the architectural registers and the physical registers. In some embodiments, there may be separate physical registers for different operand types (e.g., integer, floating-point, etc.). The physical registers, however, may be shared between different operand types in some embodiments. MDR circuit 220, in various embodiments, tracks the speculative execution and retires ops (or flushes misspeculated ops). In various embodiments, reorder buffer 225 is used in tracking the program order of ops and managing retirement/flush.

In various embodiments, MDR circuit 220 is configured to fuse eligible combination pairs that are marked by fetch and decode circuit 210 if certain criteria are met. While fusion of instructions (or corresponding instruction operations) occurs at MDR circuit 220 in various embodiments, in some embodiments fusion occurs at a different stage in the instruction pipeline, such as at the instruction buffer or the instruction cache. That is, the fusion decoder circuitry used to perform the fusion of instructions may reside at different stages of the instruction pipeline in different implementations.

LSU 234, in various embodiments, is configured to execute memory ops received from MDR circuit 220. Generally, a memory op is an instruction op specifying an access to memory (such as memory 1110 of FIG. 11), although that memory access may be completed in a cache such as DCache 217. As such, a load memory op may specify a transfer of data from a memory location to a register of processor 200, while a store memory op may specify a transfer of data from a register to a memory location. Load memory ops can be referred to as load ops or loads, and store memory ops can be referred to as store ops or stores. In various cases, the instruction set architecture implemented by processor 200 permits memory accesses to different addresses to occur out of order but may require memory accesses to the same address (or overlapping addresses, where at least one byte is accessed by both overlapping memory accesses) to occur in program order.

LSU 234 may implement multiple load pipelines ("pipes"). As an example, three load pipelines may be implemented, although more or fewer pipelines can be implemented in other cases. Each pipeline may execute a different load, independent and in parallel with other loads in other pipelines. Consequently, reservation station 232 may issue any number of loads up to the number of load pipes in the same clock cycle. Similarly, LSU 234 may further implement one or more store pipes. In some embodiments, the number of store pipes is not equal to the number of load pipes. For example, two store pipes may be used instead of three store pipes. Likewise, reservation station 232 may issue any number of stores up to the number of store pipes in the same clock cycle.

Load/store ops, in various embodiments, are received at reservation station 232, which may be configured to monitor the source operands of the load/store ops to determine when they are available and then issue the ops to the load or store pipelines, respectively. Some source operands may be available when the instruction operations are received at reservation station 232, which may be indicated in the data received by reservation station 232 from MDR circuit 220 for the corresponding instruction operation. Other operands may become available via execution of instruction operations by execution circuits 240 or even via execution of earlier load ops. The operands may be gathered by reservation station 232 or may be read from register file 245 upon issue from reservation station 232 as shown in FIG. 2. In some embodiments, reservation station 232 is configured to issue load/store ops out of order (from their original order in the code sequence being executed by processor 200) as the operands become available.

Execution circuitry 104 of FIG. 1 is shown in FIG. 2 as being implemented in one or more of execution circuits 240. Execution circuits 240, in various embodiments, include any types of execution circuits. For example, execution circuits 240 may include integer execution circuits configured to execute integer ops, floating-point execution circuits configured to execute floating-point ops, or vector execution circuits configured to execute vector ops. Generally, integer ops are ops that perform a defined operation (e.g., arithmetic, logical, shift/rotate, etc.) on integer operands and floating-point ops are ops that have been defined to operate on floating-point operands. Vector ops operate on multi-element operands and may be used to process data such as media data (e.g., image data such as pixels, audio data, etc.). As such, each execution circuit 240 may comprise hardware configured to perform the operations defined for the ops that that execution circuit is defined to handle. Execution circuits 240 may generally be independent of each other in that each execution circuit may be configured to operate on an op that was issued to that execution circuit without dependence on other execution circuits 240. Different execution circuits 240 may have different execution latencies (e.g., different pipe lengths). Any number and type of execution circuits 240 may be included in various embodiments, including embodiments having one execution circuit 240 and embodiments having multiple execution circuits 240.

FIG. 3 is a block diagram illustrating a processor configured to fuse a pair of instructions for performing an operation and adjusting a sign of the operation result. A need may arise in a computer program to adjust the sign of the result of some operation, such as an arithmetic operation. As used herein, adjusting the sign may include making sure the sign has a specified value, which may or may not involve changing the sign. If the ISA being used does not include a single instruction that both performs the operation and adjusts the sign of the result, a programmer may obtain the desired value using a pair of instructions in which the first instruction performs an operation and writes the result to a register and the second instruction adjusts the sign of the result. Such an instruction pair may advantageously be fused for execution as a single fused instruction operation.

Processor 300 of FIG. 3 includes fetch and decode circuit 302, MDR circuit 306 and execution circuit 310. Certain processor elements useful for explanation of this instruction fusion example are shown in FIG. 3; additional elements of a processor, including some of the elements shown in the example of FIG. 2, have been omitted for clarity. Fetch and decode circuit 302 and MDR circuit 306 are similar to fetch and decode circuit 210 and MDR circuit 220 as described in connection with FIG. 2, but are specialized for detection and execution of instruction pairs for adjusting a sign of a result of an operation. In an embodiment, execution circuit 310 is within a group of execution circuits for the processor, such as execution circuits 240 of FIG. 2.

First instruction 316 implements an operation OP, which may include an addition operation, a subtraction operation, a maximum or minimum operation, or some other arithmetic, logical or bitwise operation. In an embodiment, first instruction 316 implements an operation that may be carried out by an arithmetic logic unit (ALU) of a processor. In an embodiment, first instruction 316 is a floating-point instruction for implementing a floating-point operation. Second instruction 318 is an instruction for adjusting the sign of an operand, as indicated by a "+/−" symbol in FIG. 3. Second instruction 318 may be, for example, a negation instruction or an absolute value instruction. In an embodiment, second instruction 318 is a floating-point instruction for adjusting a sign of an operand represented using a floating-point format.

Pair detector circuit 304 within fetch and decode circuit 302 is configured to identify pairs of fetched instructions eligible for fusion into an instruction operation for adjusting a sign of an operation result. In determining whether first instruction 316 and second instruction 318 are eligible for fusion, one criterion that may be used by pair detector circuit 304 is that the source and destination registers of second instruction 318 are the same as the destination register of first instruction 316. Pair detector circuit 304 may also look for one or more specific operations as the operation OP performed by first instruction 316, where the specific operations are designated for potential fused execution with a sign adjustment implemented by second instruction 318. Other criteria may also be used in identifying eligible instructions for fused execution, such as whether the instructions are consecutive or both within a group of instructions such as a dispatch group.

In an embodiment, when instructions 316 and 318 are identified by fetch and decode circuit 302 as eligible for fusion, they are marked so that MDR circuit 306 can recognize the corresponding instruction operations 320 and 324 as fusion candidates. In the embodiment of FIG. 3, first instruction operation 320 is associated with a fusion indicator 322. Although illustrated as within first instruction operation 320, fusion indicator 322 may be passed from fetch and decode circuit 302 to MDR circuit 306 in a different packet or payload, and associated with first instruction operation 320 using, for example, the decode lane of instruction operation 320. Fusion indicator 322 signals to MDR circuit 306 that instruction operation 320 is a candidate for fused execution with an additional instruction operation.

In the embodiment of FIG. 3, second instruction operation 324 is associated with a sign adjust indicator 326. In a similar manner as described for fusion indicator 322, sign adjust indicator 326 may be passed from fetch and decode circuit 302 to MDR circuit 306 in a packet or payload other than second instruction operation 324 and associated with second instruction operation 324 using, for example, the decode lane of instruction operation 324. Sign adjust indicator 326 identifies an adjustment applied by second instruction operation 324 to a result of first instruction operation 320. For example, values of sign adjust indicator 326 may indicate whether a negation operation, an absolute value operation, or some other sign adjustment operation is performed by instruction operation 324. Indicators 322 and 326 form one example of how an instruction pair eligible for fusion into a fused instruction operation for adjusting a sign of an operation result can be marked; other ways of identifying eligible instruction pairs to an MDR circuit may be used in other embodiments. For example, in some embodiments a more generalized adjustment or operation indicator may be associated with second instruction operation 324, with possible values indicating sign adjustment operations or other types of operations, such as the maximum or minimum operations described in connection with FIGS. 5-7.

For one or more eligible instruction pairs, MDR circuit 306 may fuse, using fusion circuit 308, the corresponding first and second instruction operations into a single fused instruction operation such as fused instruction operation 328. In an embodiment, determination by MDR circuit 306 of whether to fuse an eligible instruction pair includes checking an availability of execution circuitry configured to execute a fused instruction operation. In the embodiment of FIG. 3, fused instruction operation 328 is associated with sign adjust indicator 326. Although illustrated as within fused instruction operation 328, sign adjust indicator 326 may be passed from MDR circuit 306 to execution circuit 310 using a different packet or payload. In an embodiment, an additional element such as a reservation station (not shown) between MDR circuit 306 and execution circuit 310 is configured to issue fused instruction operation 328 to execution circuit 310 for execution and to issue other instruction operations to other execution circuits (not shown).

Operation execution circuit 312 within execution circuit 310 is configured to perform operation OP during execution of fused instruction operation 328. Sign adjust circuit 314 is configured to adjust a sign of the result of operation execution circuit 312. For example, sign adjust circuit 314 is configured to change the sign of the result of operation execution circuit 312 if second instruction 318 is a negation instruction. If second instruction 318 is an absolute value instruction, sign adjust circuit 314 is configured to ensure that the result of operation execution circuit 312 is positive. Sign adjust indicator 326 may serve to identify to execution circuit 310 what type of sign adjustment (such as negation or absolute value) is needed. In an embodiment, logic within execution circuit 310 is similar to logic in other execution circuitry of the processor (not shown in FIG. 3), where the other execution circuitry performs the same operations or sign adjustment during separate executions of non-fused instruction operations.

In an embodiment, execution of fused instruction operation 328 using execution circuit 310 results in a single write, to the destination register, of the sign-adjusted operation result. Such execution may avoid an additional read or write of a portion of the operation result reflecting the sign of the result, when executing second instruction 318. In some embodiments, the sign adjustment portion of execution of fused instruction operation 328 is performed using a single cycle, while sign adjustment via second instruction 318 takes at least two cycles. Fusion of the instruction pair therefore may reduce latency as well as providing the other resource savings associated with having one instruction operation rather than two dispatched from MDR circuit 306.

FIG. 3 illustrates an example implementation of instruction fusion for adjusting a sign of an operation result; multiple possible alternatives and variations will be understood by one of ordinary skill in the art of processor design in view of this disclosure. For example, detection of eligible instruction pairs and fusion of eligible pairs may be distributed differently between a fetch and decode circuit and an MDR circuit in some embodiments. Detection and fusion may both be performed within a fetch and decode circuit, for example. In one embodiment, different execution circuits having different sign adjust circuits correspond to different values of sign adjust indicator 326, and fused instruction operation 328 is routed to the appropriate execution circuit based on indicator 326. In another embodiment, execution circuit 310 includes a single operation execution circuit 312 coupled to multiple sign adjust circuits, with each sign adjust circuit corresponding to a particular value of sign adjust indicator 326. In some embodiments, operation execution circuit 312 is also used for execution of non-fused instruction operations, with sign adjust circuit 314 employed in the case of fused instruction operations. In other embodiments, one or more separate operation execution circuits are used for execution of non-fused instruction operations, and execution circuit 310 is dedicated to execution of fused instruction operations.

FIG. 4 illustrates operation of execution circuit 310 for executing a fused instruction operation for performing an operation and adjusting a sign of the operation result. As also shown in FIG. 3, execution circuit 310 includes an operation execution circuit 312 and a sign adjust circuit 314. Operation execution circuit 312 includes circuitry for performing an operation specified by an incoming instruction operation being executed, such as an adder circuit for an add instruction or a multiplier circuit for a multiply instruction. In an embodiment, operation execution circuit 312 is configured for execution of both fused and non-fused instruction operations. In the embodiment of FIG. 4, operation execution circuit 312 uses operands 406 and 408. Operands 406 and 408 may include contents of source registers or immediate values in various embodiments and may be carried by an instruction operation such as fused instruction operation 328 of FIG. 3. In various embodiments, more or fewer than the two operands shown may be used in the operation performed by operation execution circuit 312.

An operation result 412 is converted by sign adjust circuit 314 to a sign-adjusted result 414. Although the operation result 412 is shown conceptually as being passed to sign adjust circuit 314, in some embodiments only a portion of the operation result, such as one or more bits indicating the sign of the result, is affected by sign adjust circuit 314. Sign adjust circuit 314 includes logic for adjusting the sign of operation result 412 in the manner specified by the instruction operation executed using execution circuit 310. In an embodiment for which an absolute value of operation result 412 is taken, sign adjust circuit 314 includes logic to ensure that sign-adjusted result 414 is a positive value. In an embodiment for which operation result 412 is negated, sign adjust circuit 314 includes logic to change the sign of sign-adjusted result 414 as compared to operation result 412. A particular sign adjust circuit 314 may be selected using an indicator associated with the incoming fused instruction operation, such as sign adjust indicator 326. In various embodiments, such selection of an appropriate sign adjust circuit 314 may be performed within execution circuit 310 or within a different area of the processor such as MDR circuit 306 or a reservation station. Sign-adjusted result 414 is written to a destination register corresponding to the architectural destination register of the original pair of instructions that was fused to form the fused instruction operation executed by execution circuit 310.

FIG. 5 is a block diagram illustrating a processor configured to fuse a pair of instructions for performing an operation and finding a maximum or minimum of the operation result as compared to a comparison operand. A need may arise in a computer program to perform some operation, such as an arithmetic operation, and then to retain the greater (or lesser) of the operation result and some other value. Unless the ISA being used includes a single instruction for this purpose, a programmer may use a pair of instructions in which the first instruction performs an operation and writes the result to a register and the second instruction reads the result and compares it to another operand to find a maximum or minimum of the operands. Such an instruction pair may advantageously be fused for execution as a single fused instruction operation.

Processor 500 of FIG. 5 includes fetch and decode circuit 502, MDR circuit 506 and execution circuit 510. Certain processor elements useful for explanation of this instruction fusion example are shown in FIG. 5; additional elements of a processor, including some of the elements shown in the example of FIG. 2, have been omitted for clarity. Fetch and decode circuit 502 and MDR circuit 506 are similar to fetch and decode circuit 210 and MDR circuit 220 as described in connection with FIG. 2 but are specialized for detection and execution of instruction pairs for finding a maximum or minimum of a result of an operation as compared to another operand. In an embodiment, execution circuit 510 is within a group of execution circuits for the processor, such as execution circuits 240 of FIG. 2.

First instruction 516 implements an operation OP in a manner similar to first instruction 316 of FIG. 3. The particular operations that are advantageously paired with the sign adjust instruction of FIG. 3 may be different than the operations advantageously paired with the maximum or minimum instruction of FIG. 5, however. Second instruction 518 is an instruction for finding either the minimum or maximum of two operands, as indicated by a "Max/Min" label. In particular, second instruction 518 may be a maximum operation or a minimum operation. In an embodiment, first instruction 516 and second instruction 518 are floating-point instructions using floating-point operands.

Pair detector circuit 504 within fetch and decode circuit 502 is configured to identify pairs of fetched instructions eligible for fusion into an instruction operation for finding a maximum or minimum of an operation result as compared to another operand. In determining whether first instruction 516 and second instruction 518 are eligible for fusion, one criterion that may be used by pair detector circuit 504 is that the source and destination registers of second instruction 518 are the same as the destination register of first instruction 516. In an embodiment, first instruction 516 has fewer operands than the maximum number of operands for an instruction supported by the ISA. For example, first instruction 516 may have no more than two operands, so that including an additional operand in the fused instruction operation for use in the maximum or minimum operation results in no more than three operands. Pair detector circuit 504 may also look for one or more specific operations as the operation OP performed by first instruction 516, where the specific operations are designated for potential fused execution with a maximum or minimum operation implemented by second instruction 518. Other criteria may also be used in identifying eligible instructions for fused execution, such as whether the instructions are consecutive or both within a group of instructions such as a dispatch group.

In an embodiment, when instructions 516 and 518 are identified by fetch and decode circuit 502 as eligible for fusion, they are marked so that MDR circuit 506 can recognize the corresponding instruction operations 520 and 524 as fusion candidates. In the embodiment of FIG. 5, first instruction operation 520 is associated with a fusion indicator 522. Although illustrated as within first instruction operation 520, fusion indicator 522 may be passed from fetch and decode circuit 502 to MDR circuit 506 in a different packet or payload, and associated with first instruction operation 520 using, for example, the decode lane of instruction operation 520. Fusion indicator 522 signals to MDR circuit 506 that instruction operation 520 is a candidate for fused execution with an additional instruction operation.

In the embodiment of FIG. 5, second instruction operation 524 is associated with a maximum/minimum ("max/min") indicator 526. In a similar manner as described for fusion indicator 522, max/min indicator 526 may be passed from fetch and decode circuit 502 to MDR circuit 506 in a packet or payload other than second instruction operation 524 and associated with second instruction operation 524 using, for example, the decode lane of instruction operation 524. Max/min indicator 526 identifies the maximum or minimum operation performed by second instruction operation 524 using a result of first instruction operation 520. For example, values of max/min indicator 526 may indicate whether a maximum or minimum operation is performed by instruction operation 524. Indicators 522 and 526 form one example of how an instruction pair eligible for fusion into a fused instruction operation for finding a maximum or minimum of an operation result as compared to another operand can be marked; other ways of identifying eligible instruction pairs to an MDR circuit may be used in other embodiments. For example, in some embodiments a more generalized adjustment or operation indicator may be associated with second instruction operation 524, with possible values indicating maximum or minimum operations or other types of operations, such as the sign adjust operations described in connection with FIGS. 3-4.

For one or more eligible instruction pairs, MDR circuit 506 may fuse, using fusion circuit 508, the corresponding first and second instruction operations into a single fused instruction operation such as fused instruction operation 528. In an embodiment, determination by MDR circuit 506 of whether to fuse an eligible instruction pair includes checking an availability of execution circuitry configured to execute a fused instruction operation. In the embodiment of FIG. 5, fused instruction operation 528 is associated with max/min indicator 526. Although illustrated as within fused instruction operation 528, max/min indicator 526 may be passed from MDR circuit 506 to execution circuit 510 using a different packet or payload. Fused instruction operation 528 is also associated with comparison operand 530, which may include contents of a register or an immediate value in various embodiments. Second instruction 518 is executable to determine a maximum or minimum between comparison operand 530 and the result of first instruction 516. In an embodiment, fused instruction operation 528 carries comparison operand 530 from second instruction 518 along with the operands (not explicitly shown) used for the operation of first instruction 516. In an embodiment, an additional element such as a reservation station (not shown) between MDR circuit 506 and execution circuit 510 is configured to issue fused instruction operation 528 to execution circuit 510 for execution and to issue other instruction operations to other execution circuits (not shown).

Operation execution circuit 512 within execution circuit 510 is configured to perform operation OP during execution of fused instruction operation 528. Max/min circuit 514 is configured to select a maximum or minimum of the result of operation execution circuit 512 as compared to comparison operand 530. For example, max/min circuit 514 is configured to write the larger of comparison operand 530 and the result of operation execution circuit 512 to a destination register if second instruction 518 is a maximum instruction. If second instruction 518 is a minimum instruction, max/min circuit 514 is configured to write the smaller of comparison operand 530 and the result of operation execution circuit 512 to the destination register. Max/min indicator 526 may serve to identify to execution circuit 510 what type of maximum or minimum operation is needed. In an embodiment, logic within execution circuit 510 is similar to logic in other execution circuitry of the processor (not shown in FIG. 5), where the other execution circuitry performs the same operations or maximum/minimum determination during separate executions of non-fused instruction operations.

In an embodiment, execution of fused instruction operation 528 using execution circuit 510 results in a single write to the destination register of the maximum or minimum of the operation result as compared to the comparison operand. Such execution avoids an additional writing of the operation result when executing first instruction 516 and reading of the result again when executing second instruction 518. In some embodiments, the maximum/minimum portion of execution of fused instruction operation 528 is performed using a single cycle, while the same operation via second instruction 518 takes at least two cycles. Fusion of the instruction pair therefore may reduce latency as well as providing the other resource savings associated with having one instruction operation rather than two dispatched from MDR circuit 506.

FIG. 5 illustrates an example implementation of instruction fusion for finding a maximum or minimum of an operation result compared to a comparison operand; multiple possible alternatives and variations will be understood by one of ordinary skill in the art of processor design in view of this disclosure. For example, detection of eligible instruction pairs and fusion of eligible pairs may be distributed differently between a fetch and decode circuit and an MDR circuit in some embodiments. Detection and fusion may both be performed within a fetch and decode circuit, for example. In one embodiment, different execution circuits having different max/min circuits correspond to different values of max/min indicator 526, and fused instruction operation 528 is routed to the appropriate execution circuit based on indicator 526. In another embodiment, execution circuit 510 includes a single operation execution circuit 512 coupled to multiple maximum or minimum circuits, with each maximum or minimum circuit corresponding to a particular value of max/min indicator 526. In some embodiments, operation execution circuit 512 is also used for execution of non-fused instruction operations, with max/min circuit 514 employed in the case of fused instruction operations. In other embodiments, one or more separate operation execution circuits are used for execution of non-fused instruction operations, and execution circuit 510 is dedicated to execution of fused instruction operations.

FIG. 6 illustrates operation of execution circuit 510 for executing a fused instruction operation for performing an operation and finding a maximum or minimum of the operation result as compared to a comparison operand. As also shown in FIG. 5, execution circuit 510 includes an operation execution circuit 512 and a max/min circuit 514. Operation execution circuit 512 includes circuitry for performing an operation specified by an incoming instruction operation being executed, such as an adder circuit for an add instruction or a multiplier circuit for a multiply instruction. In an embodiment, operation execution circuit 512 is configured for execution of both fused and non-fused instruction operations. In the embodiment of FIG. 6, operation execution circuit 512 uses operands 606 and 608 and produces operation result 612. Operands 606 and 608 may include contents of source registers or immediate values in various embodiments and may be carried by an instruction operation such as fused instruction operation 528 of FIG. 5. In an embodiment, the number of operands used in the operation performed by operation execution circuit 512 is fewer than the maximum number of operands supported by instructions in the ISA being used. For example, if a maximum of three operands are allowed in instructions in the ISA, operation execution circuit 512 uses a maximum of two operands in such an embodiment. This allows an additional operand such as comparison operand 530 to be carried by the fused instruction operation for use by max/min circuit 514.

The operation result 612 and comparison operand 530 are compared by max/min circuit 514 to produce maximum or minimum result 614. Max/min circuit 514 includes logic for determining a maximum or minimum, as specified by the instruction operation executed using execution circuit 510, between operation result 612 and comparison operand 530. In an embodiment, max/min circuit 514 includes one or more comparators and one or more multiplexors. A particular maximum or minimum circuit 514 may be selected using an indicator associated with the incoming fused instruction operation, such as max/min indicator 526. In various embodiments, such selection of an appropriate sign adjust circuit 514 may be performed within execution circuit 510 or within a different area of the processor such as MDR circuit 506 or a reservation station. Maximum or minimum result 614 is written to a destination register corresponding to the architectural destination register of the original pair of instructions that was fused to form the fused instruction operation executed by execution circuit 510.

FIG. 7 illustrates operation of execution circuitry for executing a fused instruction operation for performing an operation of finding a maximum or minimum among two operands and then finding a maximum or minimum of that result as compared to a third operand. Execution circuitry 700 is an example of execution circuit 510 of FIGS. 5 and 6 for a case in which the operation performed by operation circuit 512 is a maximum or minimum operation. Execution circuitry 700 includes operation execution circuit 702 (where the operation is a maximum or minimum operation) and max/min circuit 704. Depending on whether a maximum or minimum operation is performed by each of circuits 702 and 704, maximum or minimum result 712 can represent: the maximum of operand 606, operand 608 and comparison operand 530 (if both circuits find a maximum); the minimum of operand 606, operand 608 and comparison operand 530 (if both circuits find a minimum); the maximum of comparison operand 530 and the minimum of operands 606 and 608 (if circuit 702 finds a minimum and circuit 704 finds a maximum); or the minimum of comparison operand 530 and the maximum of operands 606 and 608 (if circuit 702 finds and maximum and circuit 704 finds a minimum).

In the embodiment of FIG. 7, both operation execution circuit 702 and max/min circuit 704 include a comparator 706 and multiplexor (MUX) 708. Comparator 706 is configured to compare operands 606 and 608 and provide one or more control signals to multiplexor 708 indicating which of the operands is larger. Multiplexor 708 is configured to output one of the operands (either the smaller or larger operand, depending on whether operation execution circuit 702 is configured as a minimum or maximum circuit) as partial max/min result 710. Result 710 and comparison operand 530 then serve as the inputs to maximum or minimum circuit 704, with either result 710 or comparison operand 530 provided as max or min result 712. In an embodiment, operand 606, operand 608 and comparison operand 530 are carried by a fused instruction operation such as fused instruction operation 528 of FIG. 5. Use of such a fused instruction operation may allow a three-way maximum or minimum operation, or a three-operand combined maximum and minimum operation, to be implemented by execution of a single instruction operation even when an ISA does not include a three-way maximum or minimum instruction.

FIG. 8 is a flow diagram illustrating an example of a method relating to fusing and executing an instruction for performing an operation with an instruction for adjusting the sign of the result of the operation. Method 800 is one embodiment of a method performed by a processor, such as processor 200 of FIG. 2 or processor 300 of FIG. 3. Other embodiments of such a method may include more or fewer blocks than shown in FIG. 8. Method 800 includes, at block 810, detecting a first instruction that is executable to perform an arithmetic/logic operation. An arithmetic/logic operation as used herein is an operation that may be carried out by an ALU, such as an arithmetic instruction (e.g., addition, multiplication, etc.), a logic instruction (e.g., a logical AND, OR or XOR) or a bitwise shift or rotate instruction. An example of a first instruction that may be detected at block 810 is first instruction 316 of FIG. 3. In an embodiment, the first instruction is further executable to write a result of the arithmetic/logic operation to a destination register.

The method further includes, at block 820, detecting a second instruction that is executable to adjust a sign of a result of the arithmetic/logic operation. In one embodiment, the second instruction is a negation instruction that is executable to change the sign of the result of the arithmetic/logic operation. In another embodiment, the second instruction is an absolute value instruction that is executable to take an absolute value of the result of the arithmetic/logic operation. An example of a second instruction that may be detected at block 820 is second instruction 318 of FIG. 3. In an embodiment, detecting the first and second instructions is performed at a fetch and decode circuit of a processor, such as fetch and decode circuit 302 of FIG. 3. Detecting the first and second instructions may be performed by a pair detector circuit such as pair detector circuit 304 of FIG. 3 in some embodiments. In an embodiment, the first and second instructions are defined by an ISA used by the processor. The first and second instructions are floating-point instructions in some embodiments.

Method 800 further includes, at block 830, fusing the first and second instructions into a fused instruction operation that is executable to perform the arithmetic/logic operation and adjust the sign of the result of the operation. In an embodiment, fusing the first and second instructions is performed at an MDR circuit of a processor, such as MDR circuit 306 of FIG. 3. Fusing the first and second instructions may be performed by a fusion circuit such as fusion circuit 308 of FIG. 3 in some embodiments. In an embodiment, fusing the first and second instructions is done only if certain merge conditions are satisfied. One such condition is that both a source register and the destination register of the second instruction are the same as the destination register of the first instruction. Another condition, in some embodiments, is that the arithmetic/logic operation that the first instruction is executable to perform is an operation designated for fused execution with a sign adjustment implemented by the second instruction. The method further includes, at block 840, executing the fused instruction operation. In an embodiment, executing the fused instruction is performed by execution circuitry such as execution circuit 310 of FIG. 3 and FIG. 4.

In some embodiments, method 800 may further include decoding of the first and second instructions into corresponding first and second instruction operations such as first instruction operation 320 and second instruction operation 324 of FIG. 3. The method may further include associating one or more of the first and second instruction operations with an indicator of eligibility for fused execution, such as fusion indicator 322 or sign adjust indicator 326 of FIG. 3. Such an indicator of eligibility may in some embodiments signal to a fusion circuit such as fusion circuit 308 of FIG. 3 that the first and second instruction operations are eligible for fusing into the fused instruction operation. In an embodiment, the decoding and/or associating is performed by a fetch and decode circuit such as fetch and decode circuit 302 of FIG. 3. In various embodiments, checking for merge conditions such as those described above may be performed by either or both of a fetch and decode circuit, such as fetch and decode circuit 302, determining whether the first and second instructions are eligible for fusing or an MDR circuit, such as MDR circuit 306 of FIG. 3, determining whether to fuse an eligible pair of instruction operations.

FIG. 9 is a flow diagram illustrating an example of a method relating to fusing and executing a first instruction for performing an operation with a second instruction for finding a maximum or minimum, as compared to a comparison operand, of a result of the operation. Method 900 is one embodiment of a method performed by a processor, such as processor 200 of FIG. 2 or processor 500 of FIG. 5. Other embodiments of such a method may include more or fewer blocks than shown in FIG. 9. Method 900 includes, at block 910, detecting a first instruction that is executable to perform an arithmetic/logic operation. The arithmetic/logic operation in block 910 is similar to that of block 810 in FIG. 8. An example of a first instruction that may be detected at block 910 is first instruction 516 of FIG. 5. In an embodiment, the first instruction uses fewer operands than the maximum number of operands supported in an instruction of the ISA being used. For example, the first instruction may have no more than two operands if the ISA permits instructions having no more than three operands. In an embodiment, the first instruction is further executable to write a result of the arithmetic/logic operation to a destination register.

The method further includes, at block 920, detecting a second instruction that is executable to find a maximum or minimum, as compared to a comparison operand, of a result of the arithmetic/logic operation. In various embodiments, the second instruction may be executable to find either a maximum or a minimum. An example of a second instruction that may be detected at block 920 is second instruction 518 of FIG. 5. In an embodiment, detecting the first and second instructions is performed at a fetch and decode circuit of a processor, such as fetch and decode circuit 502 of FIG. 5. Detecting the first and second instructions may be performed by a pair detector circuit such as pair detector circuit 504 of FIG. 5 in some embodiments. In an embodiment, the first and second instructions are defined by an ISA used by the processor. The first and second instructions are floating-point instructions in some embodiments.

Method 900 further includes, at block 930, fusing the first and second instructions into a fused instruction operation that is executable to find a maximum or minimum of the result of the arithmetic/logic operation as compared to the comparison operand. In an embodiment, fusing the first and second instructions is performed at an MDR circuit of a processor, such as MDR circuit 506 of FIG. 5. Fusing the first and second instructions may be performed by a fusion circuit such as fusion circuit 508 of FIG. 5 in some embodiments. In an embodiment, fusing the first and second instructions is done only if certain merge conditions are satisfied. One such condition is that both a source register and the destination register of the second instruction are the same as the destination register of the first instruction. Another condition, in some embodiments, is that the arithmetic/logic operation that the first instruction is executable to perform is an operation designated for fused execution with a maximum or minimum operation implemented by the second instruction. Another condition may be that the first instruction uses fewer operands than the maximum number of operands supported by the ISA being used. The method further includes, at block 940, executing the fused instruction operation. In an embodiment, executing the fused instruction is performed by execution circuitry such as execution circuit 510 of FIG. 5 and FIG. 6.

In some embodiments, method 900 may further include decoding of the first and second instructions into corresponding first and second instruction operations such as first instruction operation 520 and second instruction operation 524 of FIG. 5. The method may further include associating one or more of the first and second instruction operations with an indicator of eligibility for fused execution, such as fusion indicator 522 or max/min indicator 526 of FIG. 5. Such an indicator of eligibility may in some embodiments signal to a fusion circuit such as fusion circuit 508 of FIG. 5 that the first and second instruction operations are eligible for fusing into the fused instruction operation. In an embodiment, the decoding and/or associating is performed by a fetch and decode circuit such as fetch and decode circuit 502 of FIG. 5. In various embodiments, checking for merge conditions such as those described above may be performed by either or both of a fetch and decode circuit, such as fetch and decode circuit 502, determining whether the first and second instructions are eligible for fusing or an MDR circuit, such as MDR circuit 506 of FIG. 5, determining whether to fuse an eligible pair of instruction operations.

FIG. 10 is a flow diagram illustrating an example method relating to fusing and executing an instruction for performing a vector operation and writing a vector result to a vector destination register with an instruction for reading a first element of the vector result and overwriting one or more elements of the vector result with the first element, according to some embodiments. In an embodiment, a processor configured to perform vector operations includes vector registers having partitions allocated for storage of separate elements of a vector quantity, and replicated execution logic so that vector operations can be performed on multiple elements of a vector simultaneously. The vector quantity may be stored in various formats including a packed integer format or packed floating-point format. A programmer may in some cases want to write a single element of a result of a vector operation to multiple elements of the vector. Such an operation may be useful in working with pixels in image processing applications, for example. A programmer may therefore use a pair of instructions including a first instruction for performing a vector operation and writing the result to a destination register and a second instruction for reading an element of the result and copying the element to other elements of the destination register. Such an instruction pair may be advantageously fused for execution as a single fused instruction operation.

Method 1000 is one embodiment of a method performed by a processor, such as processor 200 of FIG. 2. The processor is configured to perform vector operations. Other embodiments of such a method may include more or fewer blocks than shown in FIG. 10. Method 1000 includes, in block 1010, detecting a first instruction that is executable to perform a vector operation and write a vector result of the vector operation to a vector destination register. In an embodiment, the first instruction is executable to perform a vector arithmetic operation or other vector operation supported by the ISA being used. The method further includes, in block 1020, detecting a second instruction that is executable to read a first element of the vector result from the vector destination register and overwrite one or more additional elements of the vector result with the first element to form a modified vector result. In an embodiment, the second instruction is a duplication instruction. The modified vector result may include, for example, the value of the first element replicated for all elements of the vector. In an embodiment, detecting the first and second instructions is performed at a fetch and decode circuit of a processor, such as fetch and decode circuit 210 of FIG. 2. Detecting the first and second instructions may be performed by a pair detector circuit such as pair detector circuit 202 of FIG. 2 in some embodiments. In an embodiment, the first and second instructions are defined by an ISA used by the processor.

Method 1000 further includes, at block 1030, fusing the first and second instructions into a fused instruction operation that is executable to perform the vector operation and write the modified vector result to the vector destination register. In an embodiment, performing the vector instruction is limited to computing the first element of the vector result and writing the modified vector result involves writing the first element into each partition of the vector destination register corresponding to an element of a vector result. In an embodiment, fusing the first and second instructions is performed at an MDR circuit of a processor, such as MDR circuit 220 of FIG. 2. Fusing the first and second instructions may be performed by a fusion circuit such as fusion circuit 204 of FIG. 2 in some embodiments. In an embodiment, fusing the first and second instructions is done only if certain merge conditions are satisfied. One such condition is that both a source register and the destination register of the second instruction are the same as the destination register of the first instruction. Another condition, in some embodiments, is that the vector operation that the first instruction is executable to perform is an operation designated for fused execution with the element overwrite operation implemented by the second instruction. The method further includes, at block 1040, executing the fused instruction operation. In an embodiment, executing the fused instruction operation is performed by execution circuitry such as execution circuitry 104 of FIG. 1. In an embodiment, such execution circuitry includes a vector operation execution circuit and a vector element overwrite circuit. The vector element overwrite operation may be implemented in the forwarding network of the processor in some embodiments, between the execution and write stages of the execution pipeline.

Execution of the fused instruction operation at block 1040 may result in a single write to the vector destination register of the modified vector result. Such execution may avoid writing of the initial vector result via execution of the first instruction and reading of the first element of the vector result via execution of the second instruction. Fusion of the instruction pair therefore may reduce latency as well as providing the other resource savings associated with having one instruction operation rather than two dispatched from an MDR circuit.

In some embodiments, method 1000 further includes decoding of the first and second instructions into corresponding first and second instruction operations and associating one or more of the first and second instruction operations with an indicator of eligibility for fused execution. Such an indicator of eligibility may in some embodiments signal to a fusion circuit such as fusion circuit 204 of FIG. 2 that the first and second instruction operations are eligible for fusing into the fused instruction operation. In an embodiment, the decoding and/or associating is performed by a fetch and decode circuit such as fetch and decode circuit 210 of FIG. 2. In various embodiments, checking for merge conditions such as those described above may be performed by either or both of a fetch and decode circuit determining whether the first and second instructions are eligible for fusing or an MDR circuit determining whether to fuse an eligible pair of instruction operations. Such a fetch and decode circuit and MDR circuit may be similar to, for example, fetch and decode circuit 302 and MDR circuit 306 of FIG. 3, except that the fetch and decode circuit and MDR circuit would be configured for detection and fusion of a vector operation/element overwrite pair as described above rather than the operation/sign adjust instruction pair of FIG. 3.

Figure 11:
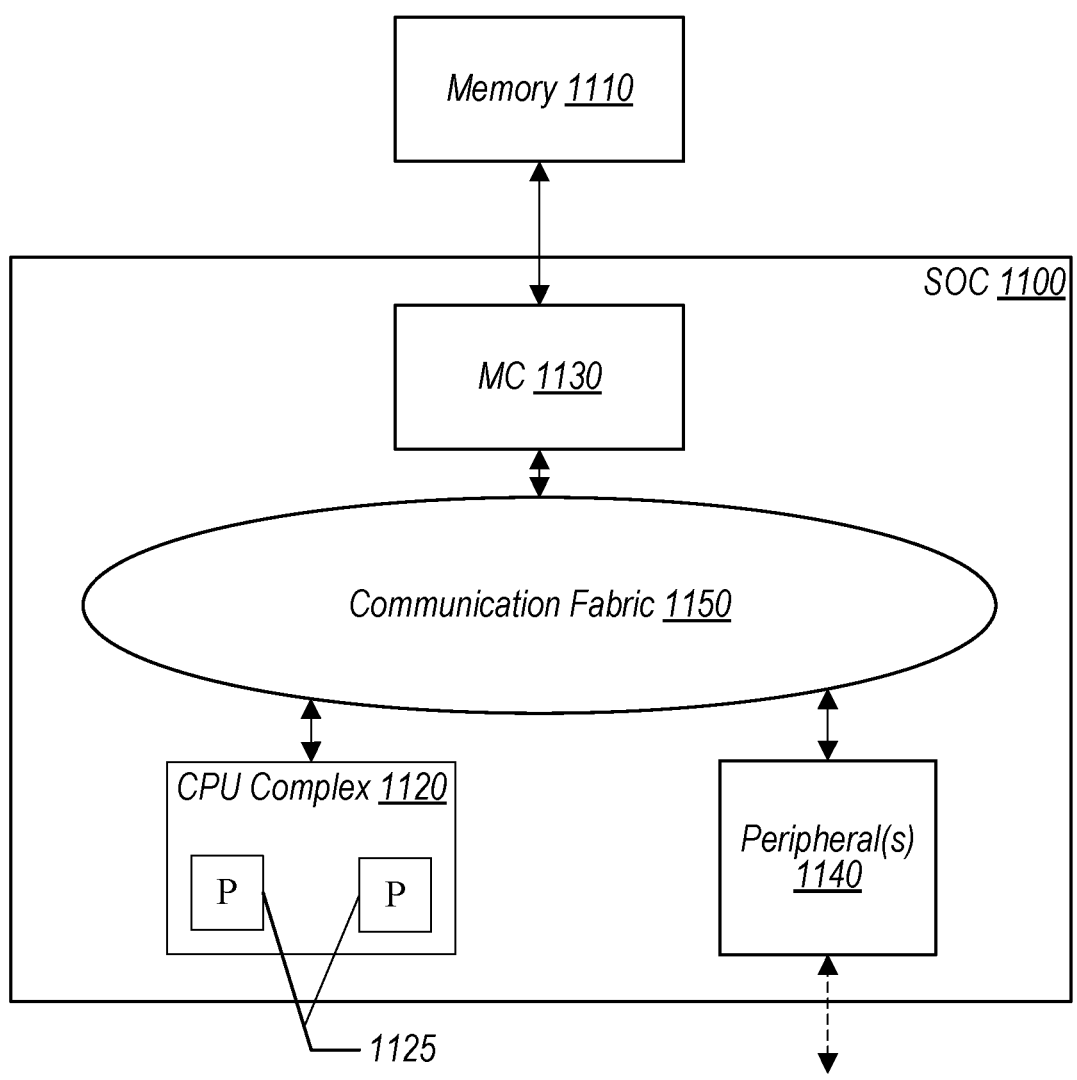
FIG. 11 is a block diagram illustrating example elements of a system on a chip (SOC) that is coupled to a memory, according to some embodiments.

Turning now to FIG. 11, a block diagram of an example system on a chip (SOC) 1100 that is coupled to a memory 1110 is depicted. As implied by the name, the components of SOC 1100 can be integrated onto a single semiconductor substrate as an integrated circuit "chip." In some cases, however, the components are implemented on two or more discrete chips in a computing system. In the illustrated embodiment, the components of SOC 1100 include a central processing unit (CPU) complex 1120, a memory controller (MC) 1130, one or more peripheral components 1140 (more briefly, "peripherals"), and a communication fabric 1150. Components 1120, 1130, and 1140 are all coupled to communication fabric 1150 as depicted, and memory controller 1130 may be coupled to memory 1110 during use. Also as shown, CPU complex 1120 includes at least two processors 1125 (P 1125 in FIG. 11). In some embodiments, SOC 1100 is implemented differently than shown. For example, SOC 1100 may include an always-on component, a display controller, a power management circuit, etc. It is noted that the number of components of SOC 1100 (and the number of subcomponents for those shown in FIG. 11, such as within the CPU complex 1120) may vary between embodiments. Accordingly, there may be more or fewer of each component or subcomponent than the number shown in FIG. 11.

Memory 1110, in various embodiments, is usable to store data and program instructions that are executable by CPU complex 1120 to cause a system having SOC 1100 and memory 1110 to implement operations described herein. Memory 1110 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), etc. Memory available to SOC 1100 is not limited to primary storage such as memory 1110. Rather, SOC 1100 may further include other forms of storage such as cache memory (e.g., L1 cache, L2 cache, etc.) in CPU complex 1120.

CPU complex 1120, in various embodiments, includes a set of processors 1125 that serve as a CPU of the SOC 1100. Processors 1125 may execute the main control software of the system, such as an operating system. Generally, software executed by the CPU during use control the other components of the system to realize the desired functionality of the system. Processors 1125 may further execute other software, such as application programs. An application program may provide user functionality and rely on the operating system for lower-level device control, scheduling, memory management, etc. Consequently, processors 1125 may also be referred to as application processors. CPU complex 1120 may include other hardware such as an L2 cache and/or an interface to the other components of the system (e.g., an interface to communication fabric 1150).

A processor 1125, in various embodiments, includes any circuitry and/or microcode that is configured to execute instructions defined in an instruction set architecture implemented by that processor 1125. Processors 1125 may fetch instructions and data from memory 1110 as a part of executing load instructions and store the fetched instructions and data within caches of CPU complex 1120. In various embodiments, processors 1125 share a common last level cache (e.g., an L2 cache) while including their own caches (e.g., an L0 cache, an L1 cache, etc.) for storing instructions and data. Processors 1125 may retrieve instructions and data (e.g., from the caches) and execute the instructions (e.g., conditional branch instructions, ALU instructions, etc.) to perform operations that involve the retrieved data. Processors 1125 may then write a result of those operations back to memory 1110. Processors 1125 may encompass discrete microprocessors, processors and/or microprocessors integrated into multichip module implementations, processors implemented as multiple integrated circuits, etc.

Memory controller 1130, in various embodiments, includes circuitry that is configured to receive, from the other components of SOC 1100, memory requests (e.g., load/store requests) to perform memory operations, such as accessing data from memory 1110. Memory controller 1130 may be configured to access any type of memory 1110, such as those discussed earlier. In various embodiments, memory controller 1130 includes queues for storing memory operations, for ordering and potentially reordering the operations and presenting the operations to memory 1110. Memory controller 1130 may further include data buffers to store write data awaiting write to memory 1110 and read data awaiting return to the source of a memory operation. In some embodiments, memory controller 1130 may include a memory cache to store recently accessed memory data. In SOC implementations, for example, the memory cache may reduce the power consumption in SOC 1100 by avoiding re-access of data from memory 1110 if it is expected to be accessed again soon. In some cases, the memory cache may also be referred to as a system cache, as opposed to private caches (e.g., L1 caches) in processors 1125 that serve only certain components. But, in some embodiments, a system cache need not be located within memory controller 1130.

Peripherals 1140, in various embodiments, are sets of additional hardware functionality included in SOC 1100. For example, peripherals 1140 may include video peripherals such as an image signal processor configured to process image capture data from a camera or other image sensor, GPUs, video encoder/decoders, scalers, rotators, blenders, display controllers, etc. As other examples, peripherals 1140 may include audio peripherals such as microphones, speakers, interfaces to microphones and speakers, audio processors, digital signal processors, mixers, etc. Peripherals 1140 may include interface controllers for various interfaces external to SOC 1100, such as Universal Serial Bus (USB), peripheral component interconnect (PCI) including PCI Express (PCIe), serial and parallel ports, etc. The interconnection to external devices is illustrated by the dashed arrow in FIG. 11 that extends external to SOC 1100. Peripherals 1140 may include networking peripherals such as media access controllers (MACs).

Communication fabric 1150 may be any communication interconnect and protocol for communicating among the components of SOC 1100. For example, communication fabric 1150 may enable processors 1125 to issue and receive requests from peripherals 1140 to access, store, and manipulate data. In some embodiments, communication fabric 1150 is bus-based, including shared bus configurations, cross bar configurations, and hierarchical buses with bridges. In some embodiments, communication fabric 1150 is packet-based, and may be hierarchical with bridges, cross bar, point-to-point, or other interconnects.

Figure 12:
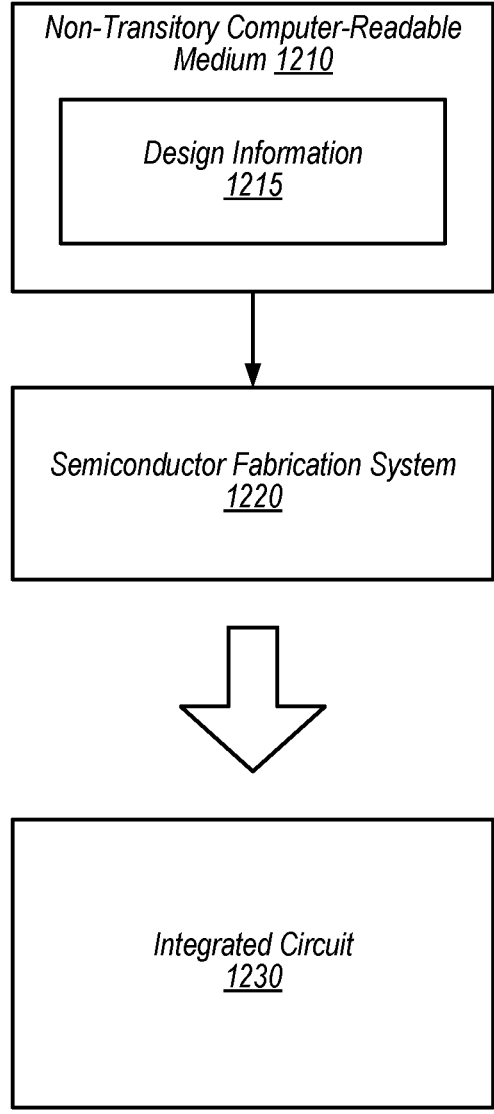
FIG. 12 is a block diagram illustrating an example process of fabricating at least a portion of an SOC, according to some embodiments.

Turning now to FIG. 12, a block diagram illustrating an example process of fabricating an integrated circuit 1230 that can include at least a portion of SOC 1100 is shown. The illustrated embodiment includes a non-transitory computer-readable medium 1210 (which includes design information 1215), a semiconductor fabrication system 1220, and a resulting fabricated integrated circuit 1230. In some embodiments, integrated circuit 1230 includes at least a CPU complex 1120, a memory controller 1130, and one or more peripherals 1140.

Integrated circuit 1230 may further additionally or alternatively includes other circuits such as a wireless network circuit. In the illustrated embodiment, semiconductor fabrication system 1220 is configured to process design information 1215 to fabricate integrated circuit 1230.

Non-transitory computer-readable medium 1210 may include any of various appropriate types of memory devices or storage devices. For example, non-transitory computer-readable medium 1210 may include at least one of an installation medium (e.g., a CD-ROM, floppy disks, or tape device), a computer system memory or random-access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 1210 may include two or more memory mediums, which may reside in different locations (e.g., in different computer systems that are connected over a network).

Design information 1215 may be specified using any of various appropriate computer languages, including hardware description languages such as, without limitation: VHDL, Verilog, SystemC, SystemVerilog, RHDL, M, MyHDL, etc. Design information 1215 may be usable by semiconductor fabrication system 1220 to fabricate at least a portion of integrated circuit 1230. The format of design information 1215 may be recognized by at least one semiconductor fabrication system 1220. In some embodiments, design information 1215 may also include one or more cell libraries, which specify the synthesis and/or layout of integrated circuit 1230. In some embodiments, the design information is specified in whole or in part in the form of a netlist that specifies cell library elements and their connectivity. Design information 1215, taken alone, may or may not include sufficient information for fabrication of a corresponding integrated circuit (e.g., integrated circuit 1230). For example, design information 1215 may specify circuit elements to be fabricated but not their physical layout. In this case, design information 1215 may be combined with layout information to fabricate the specified integrated circuit.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 is configured to operate according to a circuit design specified by design information 1215, which may include performing any of the functionality described herein. For example, integrated circuit 1230 may include any of various elements described with reference to FIGS. 1-10. Furthermore, integrated circuit 1230 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 1230 is performed. Design information 1215 may be generated using one or more computer systems and stored in non-transitory computer-readable medium 1210. The method may conclude when design information 1215 is sent to semiconductor fabrication system 1220 or prior to design information 1215 being sent to semiconductor fabrication system 1220. Accordingly, in some embodiments, the method may not include actions performed by semiconductor fabrication system 1220. Design information 1215 may be sent to semiconductor fabrication system 1220 in a variety of ways. For example, design information 1215 may be transmitted (e.g., via a transmission medium such as the Internet) from non-transitory computer-readable medium 1210 to semiconductor fabrication system 1220 (e.g., directly or indirectly). As another example, non-transitory computer-readable medium 1210 may be sent to semiconductor fabrication system 1220. In response to the method of initiating fabrication, semiconductor fabrication system 1220 may fabricate integrated circuit 1230 as discussed above.

Figure 13:
FIG. 13 is a block diagram illustrating an example SOC that is usable in various types of systems, according to some embodiments.

Turning next to FIG. 13, a block diagram of one embodiment of a system 1300 is shown that may incorporate and/or otherwise utilize the methods and mechanisms described herein. In the illustrated embodiment, the system 1300 includes at least one instance of a system on chip (SOC) 1100 that is coupled to external memory 1110, peripherals 1140, and a power supply 1305. Power supply 1305 is also provided which supplies the supply voltages to SOC 1100 as well as one or more supply voltages to the memory 1110 and/or the peripherals 1140. In various embodiments, power supply 1305 represents a battery (e.g., a rechargeable battery in a smart phone, laptop or tablet computer, or other device). In some embodiments, more than one instance of SOC 1100 is included (and more than one external memory 1110 is included as well).

As illustrated, system 1300 is shown to have application in a wide range of areas. For example, system 1300 may be utilized as part of the chips, circuitry, components, etc., of a desktop computer 1310, laptop computer 1320, tablet computer 1330, cellular or mobile phone 1340, or television 1350 (or set-top box coupled to a television). Also illustrated is a wearable device 1360, such as a smartwatch and/or health monitoring device. In some embodiments, a smartwatch may include a variety of general-purpose computing related functions. For example, a smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1300 may further be used as part of a cloud-based service(s) 1370. For example, the previously mentioned devices, and/or other devices, may access computing resources in the cloud (e.g., remotely located hardware and/or software resources). Still further, system 1300 may be utilized in one or more devices of a home 1380 other than those previously mentioned. For example, appliances within home 1380 may monitor and detect conditions that warrant attention. For example, various devices within home 1380 (e.g., a refrigerator, a cooling system, etc.) may monitor the status of the device and provide an alert to the homeowner (or, for example, a repair facility) should a particular event be detected. Alternatively, a thermostat may monitor the temperature in home 1380 and may automate adjustments to a heating/cooling system based on a history of responses to various conditions by the homeowner. Also illustrated in FIG. 13 is the application of system 1300 to various modes of transportation 1390. For example, system 1300 may be used in the control and/or entertainment systems of aircraft, trains, buses, cars for hire, private automobiles, waterborne vessels from private boats to cruise liners, scooters (for rent or owned), and so on. In various cases, system 1300 may be used to provide automated guidance (e.g., self-driving vehicles), general systems control, and otherwise. These any many other embodiments are possible and are contemplated. It is noted that the devices and applications illustrated in FIG. 13 are illustrative only and are not intended to be limiting. Other devices are possible and are contemplated.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations.

It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail.

Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A processor, comprising:
   a hardware fetch and decode circuit including hardware pair detector circuitry, wherein the hardware pair detector circuitry is configured to:
   receive fetched instructions;
   detect a first instruction that is executable to perform an arithmetic/logic operation and a second instruction that is executable to adjust a sign of a result of the arithmetic/logic operation;
   determine whether the first instruction and the second instruction are eligible for fusion; and in response to determining that the first instruction and the second instruction are eligible for fusion,
  generate, for a first instruction operation decoded from the first instruction, an indicator of eligibility for fusion with a second instruction operation decoded from the second instruction; and
  forward from the hardware fetch and decode circuit the indicator of eligibility with the first instruction operation and the second instruction operation;
a hardware map-dispatch-rename (MDR) circuit including hardware fusion circuitry, wherein:
  the hardware MDR circuit is configured to:
    receive the first instruction operation and the second instruction operation;
    detect the indicator of eligibility, if received; and
    based in part on whether the indicator of eligibility is detected, determine whether to fuse the first instruction operation and the second instruction operation; and
  the hardware fusion circuitry is configured to fuse the first instruction operation and the second instruction operation into a fused instruction operation that is executable to perform the arithmetic/logic operation and adjust the sign of the result; and
hardware execution circuitry coupled to the hardware MDR circuit and configured to execute the fused instruction operation.

2. The processor of claim 1, wherein the second instruction is a negation instruction, and the fused instruction operation is executable to negate the result of the arithmetic/logic operation.

3. The processor of claim 1, wherein the second instruction is an absolute value instruction, and the fused instruction operation is executable to take an absolute value of the result of the arithmetic/logic operation.

4. The processor of claim 1, wherein the hardware execution circuitry comprises:
  a hardware arithmetic/logic operation execution circuit; and
  a hardware sign adjust circuit.

5. The processor of claim 4, further comprising an additional hardware sign adjust circuit, and wherein the processor is configured to use the additional hardware sign adjust circuit to execute non-fused sign adjust instruction operations but not to execute the fused instruction operation.

6. The processor of claim 1, wherein:
  the first instruction and the second instruction are floating-point instructions;
  the fused instruction operation is a floating-point instruction operation; and
  the hardware execution circuitry is floating-point hardware execution circuitry.

7. The processor of claim 1, wherein:
  the hardware pair detector circuitry is further configured to, in response to determining that the first instruction and the second instruction are eligible for fusion,
    generate for the second instruction operation an indicator of a type of operation performed by execution of the second instruction, and
    forward from the hardware fetch and decode circuit the indicator of a type of operation with the second instruction operation;
  the hardware pair detector circuitry is further configured to, in response to determining that the first instruction and the second instruction are not eligible for fusion,
    forward from the hardware fetch and decode circuit the first instruction operation and the second instruction operation without generating the indicator of eligibility or the indicator of a type of operation; and
  the hardware MDR circuit is further configured to:
    detect the indicator of a type of operation, if received; and
    determine whether to fuse the first instruction operation and the second instruction operation based in part on the indicator of a type of operation.

8. The processor of claim 7, wherein the hardware fusion circuitry is further configured to associate the indicator of a type of operation with the fused instruction operation.

9. The processor of claim 1, wherein the indicator of eligibility for fusion is within the first instruction operation.

10. The processor of claim 1, wherein the hardware MDR circuit is further configured to determine whether to fuse the first instruction operation and the second instruction operation based in part on an availability of the hardware execution circuitry.

11. A method, comprising:
  detecting, by a hardware fetch and decode circuit of a processor, a first instruction that is executable by the processor to perform an arithmetic/logic operation and a second instruction that is executable by the processor to adjust a sign of a result of the arithmetic/logic operation;
  decoding, by the hardware fetch and decode circuit, the first instruction and the second instruction into a first instruction operation and a second instruction operation for execution;
  determining, by the hardware fetch and decode circuit, that the first instruction and the second instruction are eligible for fusion;
  in response to determining that the first instruction and the second instruction are eligible for fusion, generating for the first instruction operation an indicator of eligibility for fusion with the second instruction operation;
  forwarding, to a hardware map-dispatch-rename (MDR) circuit of the processor, the first instruction operation, the indicator of eligibility and the second instruction operation;
  based in part on the indicator of eligibility, determining, in the hardware MDR circuit, that the first instruction operation and the second instruction operation should be fused;
  in response to determining that the first instruction operation and the second instruction operation should be fused, fusing the first instruction operation and the second instruction operation into a fused instruction operation that is executable by the processor to perform the arithmetic/logic operation and adjust the sign of the result; and
  executing, by the processor, the fused instruction operation.

12. The method of claim 11, wherein the second instruction is a negation instruction and the fused instruction operation is executable to negate the result of the arithmetic/logic operation.

13. The method of claim 11, wherein the second instruction is an absolute value instruction, and the fused instruction operation is executable to take an absolute value of the result of the arithmetic/logic operation.

14. The method of claim 11, wherein executing the fused instruction operation comprises using an arithmetic/logic operation execution circuit dedicated to execution of fused instruction operations in lieu of an additional arithmetic/logic operation execution circuit used for execution of non-fused instruction operations.

15. The method of claim 11, wherein the first instruction and the second instruction are floating-point instructions and the fused instruction operation is a floating point instruction operation.

16. A system, comprising:

one or more memory controllers;

one or more peripheral components;

a processor; and a communication fabric configured to interconnect the one or more memory controllers, the one or more peripheral components and the processor, wherein the processor includes:

a hardware fetch and decode circuit including hardware pair detector circuitry, wherein the hardware pair detector circuitry is configured to:

receive fetched instructions;

detect a first instruction that is executable to perform an arithmetic/logic operation and a second instruction that is executable to adjust a sign of a result of the arithmetic/logic operation;

determine whether the first instruction and the second instruction are eligible for fusion; and in response to determining that the first instruction and the second instruction are eligible for fusion, generate, for a first instruction operation decoded from the first instruction, an indicator of eligibility for fusion with a second instruction operation decoded from the second instruction; and forward from the hardware fetch and decode circuit the first instruction operation with the indicator of eligibility and the second instruction operation;

a hardware map-dispatch-rename (MDR) circuit including hardware fusion circuitry, wherein:

the hardware MDR circuit is configured to:

receive the first instruction operation and the second instruction operation;

detect the indicator of eligibility, if received; and based on whether the indicator of eligibility is detected, determine whether to fuse the first instruction operation and the second instruction operation; and the hardware fusion circuitry is configured to fuse the first instruction operation and the second instruction operation into a fused instruction operation that is executable to perform the arithmetic/logic operation and adjust the sign of the result; and hardware execution circuitry coupled to the hardware fusion circuitry and configured to execute the fused instruction operation.

17. The system of claim 16, wherein the second instruction is a negation instruction, and the fused instruction operation is executable to negate the result of the arithmetic/logic operation.

18. The system of claim 16, wherein the second instruction is an absolute value instruction, and the fused instruction operation is executable to take an absolute value of the result of the arithmetic/logic operation.

19. The system of claim 16, wherein the hardware execution circuitry comprises:

a hardware arithmetic/logic operation execution circuit; and a hardware sign adjust circuit.

20. The system of claim 19, wherein the processor further comprises an additional hardware sign adjust circuit, and wherein the processor is configured to use the additional hardware sign adjust circuit to execute non-fused sign adjust instruction operations but not to execute the fused instruction operation.

* * * * *